US012391590B1

(12) United States Patent
Hopwood et al.

(10) Patent No.: US 12,391,590 B1
(45) Date of Patent: Aug. 19, 2025

(54) DEPLOYMENT OF STRUCTURALLY ALTERED GASEOUS WATER MOLECULES USING DIRECT INJECTION AND COARSE, FINE, MICRO, AND NANOBUBBLE DIFFUSION INTO LIQUID, SOLID, GASEOUS, AND MULTIPHASE SYSTEMS

(71) Applicant: DTT DEAL, LLC, Sheridan, WY (US)

(72) Inventors: Brad Hopwood, Sheridan, WY (US); Gene Dedick, Grand Junction, CO (US)

(73) Assignee: DTT DEAL, LLC, Sheridan, WY (US)

( * ) Notice: Subject to any disclaimer, the term of this patent is extended or adjusted under 35 U.S.C. 154(b) by 0 days.

(21) Appl. No.: 19/031,976

(22) Filed: Jan. 18, 2025

(51) Int. Cl.
*C02F 1/74* (2023.01)
*C02F 101/36* (2006.01)

(52) U.S. Cl.
CPC ............ *C02F 1/74* (2013.01); *C02F 2101/36* (2013.01); *C02F 2209/02* (2013.01); *C02F 2209/44* (2013.01)

(58) Field of Classification Search
None
See application file for complete search history.

(56) References Cited

U.S. PATENT DOCUMENTS

| 11,964,235 | B1* | 4/2024 | Dedick | C25B 15/081 |
| 11,993,683 | B1* | 5/2024 | Dedick | C25B 15/031 |
| 12,122,969 | B1* | 10/2024 | Dedick | C10L 1/328 |
| 12,129,345 | B1* | 10/2024 | Dedick | C08F 8/26 |
| 2004/0170538 | A1* | 9/2004 | Kawakami | B01J 19/10 422/186 |
| 2021/0078881 | A1* | 3/2021 | Lloyd | C02F 1/705 |
| 2024/0261764 | A1* | 8/2024 | Legg | B01J 20/3416 |

* cited by examiner

*Primary Examiner* — Richard C Gurtowski
(74) *Attorney, Agent, or Firm* — Georgiy L. Khayet

(57) ABSTRACT

Methods and systems for deployment of structurally altered gaseous water molecules derived from water are provided. An example method includes generating structurally altered gaseous water molecules from water, where the structurally altered gaseous water molecules have a higher probability of attraction of electrons into areas adjunct to the structurally altered gaseous water molecules than molecules of the water, providing the structurally altered gaseous water molecules to a diffuser to generate bubbles of a predetermined size, where the bubbles include the structurally altered gaseous water molecules, and introducing the bubbles into an environment of a chemical process, where the structurally altered gaseous water molecules facilitate generation of hydrated electrons and electron energy transfers during the chemical process, thereby increasing output of the chemical process.

20 Claims, 26 Drawing Sheets

Calorimetry Test Results

| Sample | Total Heat of Combustion (Cal) | Pressure of Gas in Bomb (psi) | Heat of Combustion (Cal/PSI) | Avg. Heat of Combustion (cal/psi) | Avg. Heat of Combustion (kJ/g) | Energy Increase (kJ/g) (%) |
|---|---|---|---|---|---|---|
| Hydrogen | 1074 | 25 | 43.0 | 44.0 | 0.184 | — |
|  | 1799 | 40 | 45.0 | | | |
| Gas (Structurally Altered Gaseous Water Molecules) | 572 | 10 | 57.2 | 53.3 | 0.223 | 21.2% |
|  | 510 | 10 | 51.0 | | | |
|  | 773 | 14 | 55.2 | | | |
|  | 746 | 15 | 49.8 | | | |

| Components | Mol % | Wt. % | at 14.696 psia |
|---|---|---|---|
| Hydrogen | 67 | 11.3 | |
| Oxygen | 33 | 88.7 | |
| Helium | NIL | NIL | |
| Carbon Monoxide | NIL | NIL | |
| Carbon Dioxide | NIL | NIL | |
| Sulfur | NIL | NIL | |
| Nitrogen | NIL | NIL | |
| Methane | NIL | NIL | |
| Ethane | NIL | NIL | |
| Ethylene | NIL | NIL | |
| Propane | NIL | NIL | |
| Propylene | NIL | NIL | |
| ISO-Butane | NIL | NIL | |
| n-Butane | NIL | NIL | |
| Propidine | NIL | NIL | |
| Trans-2-Butene | NIL | NIL | |
| 1-Butene | NIL | NIL | |
| ISO-Butylene | NIL | NIL | |
| CIS-2-Butene | NIL | NIL | |
| NEO Pentane | NIL | NIL | |
| ISO-Pentane | NIL | NIL | |
| n-Pentane | NIL | NIL | |
| 1,3 Butadiene | NIL | NIL | |
| Hexanes Plus | NIL | NIL | |

FIG. 13

Compatible Gas Specifications

| | Natural Gas | Hydrogen | Structurally Altered Gaseous Water Molecules ("Gas") |
|---|---|---|---|
| HHV MJ/kg | 52.70 | 141.70 | 172.87 |
| Energy Density (MJ*kg/SM3) | 37.43 | 12.75 | 89.03 |
| Atomic Mass (g/mol) | 16.04 | 1.01 | 12.16 |
| Density (kg/SM3) | 0.72 | 0.09 | 0.52 |
| HHV (MJ/M3 at 200 bar) | 39.76 | 12.76 | 97.93 |
| Volume (AMU/Density at SM3) | 22.37 | 11.20 | 23.61 |
| (SM3 at 1.01325 bar, 15C) (14.696 psig) | 600 | 848 | 2200 |
| Liquid to Gas volume ratio | | | |

Waldheim & Nilsson 2001 for Nat Gas and Hydrogen Number

FIG. 14

| Sample #'s | Time of Gassing | Oxidizer | Date | Time | Temp(F) | | Time (Mins) | PFA Total (PPT) | PFOS (PPT) | PFOA (PPT) | 6:2 FTS (PPT) | 8:2 FTS (PPT) | PFHxA (PPT) |
|---|---|---|---|---|---|---|---|---|---|---|---|---|---|
| Test 1 | | | | | | Test 1 | | | | | | | |
| 2BLK Mix 1 | None | None | Day One | 11:45 | 82.2 | | 0 | 340.75 | 149.44 | 0 | 137.46 | 53.85 | 0 |
| 3 Mix 1 | 10 Mins | None | Day One | 12:00 | 80.5 | | 10 | 9.8 | 0 | 0 | 9.8 | 0 | 0 |
| 4 Mix 1 | 40 Mins | None | Day One | 12:31 | 79.5 | | 40 | 453.67 | 100.18 | 0 | 210.78 | 134.53 | 8.18 |
| 5 Mix 1 | 1 Hour 10 Mins | None | Day One | 13:01 | 78.4 | | 70 | 0 | 0 | 0 | 0 | 0 | 0 |
| Test 2 | | | | | | Test 2 | | | | | | | |
| 2BLK Mix 1 | None | None | Day One | 11:45 | 82.2 | | 0 | 340.75 | 149.44 | 0 | 137.46 | 53.85 | 0 |
| 6 Mix 1 | None | 15 Mins Pretreatment | Day One | 13:25 | 78.8 | | 5 | 63.45 | 12.9 | 0 | 41.3 | 9.25 | 0 |
| 7 Mix 1 | 10 Mins | 15 Mins Pretreatment | Day One | 13:49 | 79.8 | | 10 | 359.22 | 188.04 | 0 | 99.77 | 71.41 | 0 |
| 8 Mix 1 | 40 Mins | 15 Mins Pretreatment | Day One | 14:08 | 79.5 | | 40 | 0 | 0 | 0 | 0 | 0 | 0 |
| 9 Mix 1 | 1 Hour 10 Mins | 15 Mins Pretreatment | Day One | 14:38 | 80 | | 70 | 0 | 0 | 0 | 0 | 0 | 0 |

FIG. 22

DEPLOYMENT OF STRUCTURALLY ALTERED GASEOUS WATER MOLECULES USING DIRECT INJECTION AND COARSE, FINE, MICRO, AND NANOBUBBLE DIFFUSION INTO LIQUID, SOLID, GASEOUS, AND MULTIPHASE SYSTEMS

TECHNICAL FIELD

This disclosure relates to deployment of structurally altered gaseous water molecules. More specifically, this disclosure relates to deployment of structurally altered gaseous water molecules using direct injection and coarse, fine, micro, and nanobubble diffusion into liquid, solid, gaseous, and multiphase systems.

BACKGROUND

One of the main environmental challenges is the effective removal of polymers, non-polymer organics, and inorganics from various media, which include solids, liquids, and gases. Polymers, such as plastics, non-polymer organics and inorganics are prevalent in industrial processes and consumer products. Over time, they can accumulate in the environment, leading to significant issues such as soil contamination, water pollution, and air quality degradation.

In recent history, significant time and research has been devoted to understanding polymeric and non-polymeric per- and polyfluoroalkyl compounds, (PFAS). Polymeric PFAS like Polytetrafluoroethylene, (PTFE) and Non-Polymeric PFAS like, perfluorooctanoic acid (PFOA) and Perfluorooctane sulfonate, (PFOS) incorporate fluorine within their chemical structure. These materials exhibit unique properties such as exceptional chemical resistance, low friction, and high thermal stability. These fluorinated polymers and non-polymers are synthetic organofluorine compounds characterized by fluorine atoms bonded to alkyl chains. Examples of polymeric PFAS include Teflon, (polytetrafluoroethylene) and other non-sticking coatings such as perfluoroalkoxy alkane. Examples of non-polymeric PFAS include perfluorooctanoic acid (PFOA) and Perfluorooctane sulfonate, (PFOS). In many cases PFOA and PFOS, (smaller molecules), are formed when the larger polymeric molecules break down to smaller non-polymeric subcomponents. There is much concern about the effect of these smaller non-polymeric PFAS on the environment.

Polymeric and non-polymeric PFAS are widely utilized in various products and materials due to their superior, non-sticking, thermal resistant, chemical resistant, and water-repellent properties. However, their persistence in the environment has raised concerns, especially the non-polymeric forms, as they are known to pose significant risks to ecosystems and human health. Conventional treatment methods, such as activated carbon filtration, ion exchange, and advanced oxidation techniques, are often unable to effectively eliminate PFAS from solids, liquids, and gases.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to one example embodiment of the present disclosure, a method for deployment of structurally altered gaseous water molecules derived from water is provided. The method may commence with generating structurally altered gaseous water molecules from water. The structurally altered gaseous water molecules may have a higher probability of attraction of electrons into areas adjunct to the structurally altered gaseous water molecules than molecules of the water. The method may proceed with providing structurally altered gaseous water molecules to a diffuser to generate bubbles of a predetermined size. The bubbles may include structurally altered gaseous water molecules. The method may further include introducing the bubbles into an environment of a chemical process. The structurally altered gaseous water molecules may facilitate generation of hydrated electrons and electron energy transfers during the chemical process, thereby increasing output of the chemical process.

According to another embodiment of the present disclosure, a system for deployment of structurally altered gaseous water molecules derived from water is provided. The system may include an apparatus for generating structurally altered gaseous water molecules from water. The structurally altered gaseous water molecules may have a higher probability of attraction of electrons into areas adjunct to the structurally altered gaseous water molecules than molecules of the water. The system may further include a diffuser for generating bubbles of a predetermined size from the structurally altered gaseous water molecules. The system may further include an injector for introducing the bubbles into an environment of a chemical process. The structurally altered gaseous water molecules may facilitate electron energy transfers and formation of hydrated and partially hydrated electrons during the chemical process, thereby increasing output of the chemical process.

Other example embodiments of the disclosure and aspects will become apparent from the following description taken in conjunction with the following drawings.

BRIEF DESCRIPTION OF DRAWINGS

Embodiments are illustrated by way of example and not limitation in the figures of the accompanying drawings, in which like references indicate similar elements.

FIG. 12 is a table illustrating calorimetry test results of the bomb calorimetry study, according to an example embodiment.

FIG. 13 illustrates characteristics of structurally altered gaseous water molecules, according to an example embodiment.

FIG. 14 illustrates characteristics of structurally altered gaseous water molecules, according to an example embodiment.

FIG. 22 shows a table of master test data associated with a method for degradation of PFAS, according to an example embodiment.

DETAILED DESCRIPTION

Figure 1:
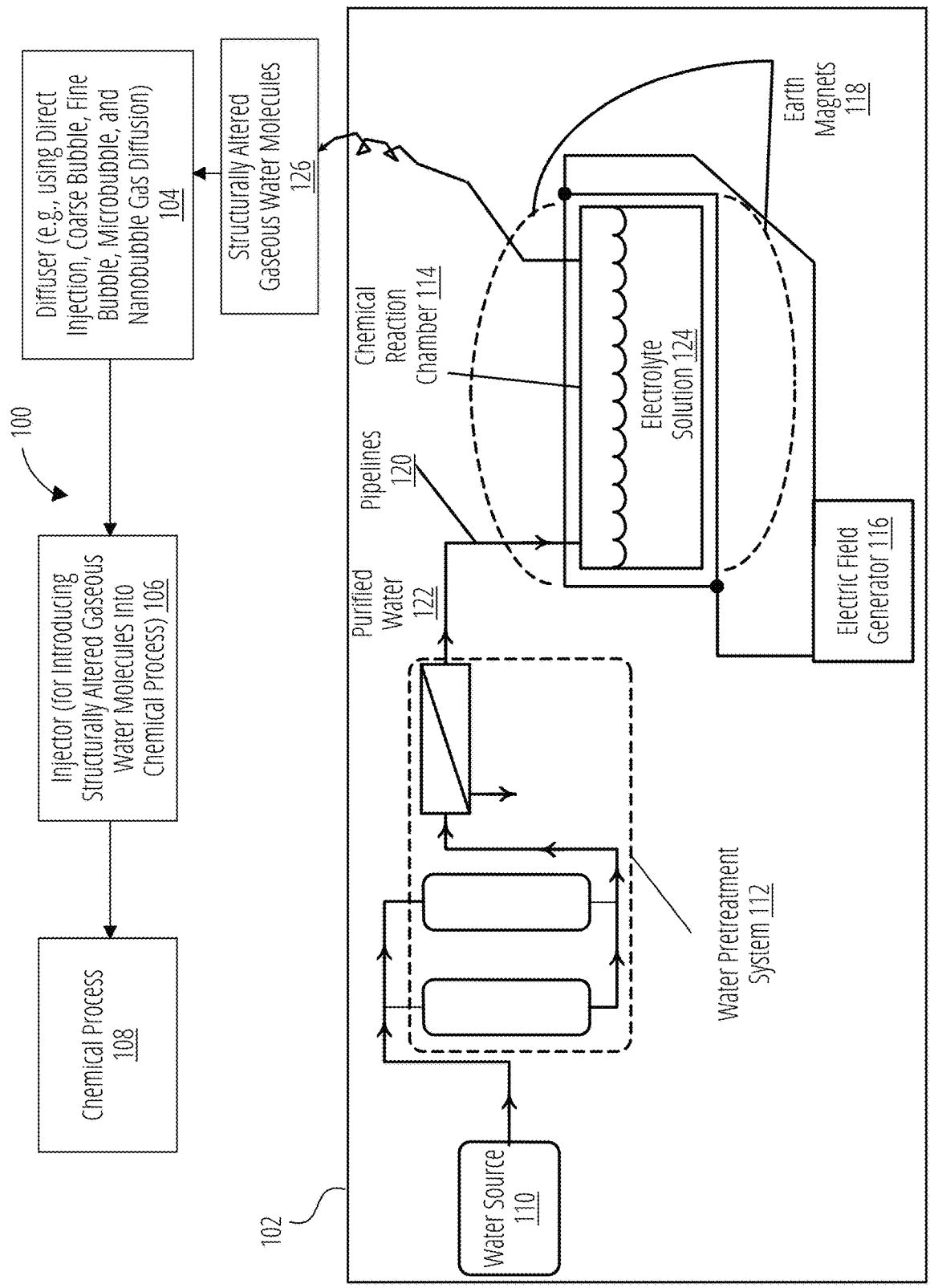
FIG. 1 illustrates a system for deployment of structurally altered gaseous water molecules derived from water, according to an example embodiment.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and operational changes can be made without departing from the scope of what is claimed. The following detailed description is, therefore, not to be taken in a limiting sense, and the scope is defined by the appended claims and their equivalents.

Generally, the embodiments of this disclosure relate to systems and methods for deployment of structurally altered gaseous water molecules using direct injection and coarse, fine, micro, and nanobubble diffusion into liquid, solid, gaseous, and multiphase systems. The method may commence with generating structurally altered gaseous water molecules from water. The structurally altered gaseous water molecules are also referred to herein as "gas" or "gas product". The generation of the structurally altered gaseous water molecules may be performed in a chemical reaction chamber that accommodates compound mixtures in a solid, liquid, gas, or multiphase form. The chemical reaction chamber may have a specific geometric electromagnetic field configuration to attract hydrated and/or conventional electrons into the adjacent areas of the water molecules without a chemical reaction occurring between the water molecules.

The method according to the present disclosure uses a water molecule with special characteristics by treatment of water in the chemical reaction chamber. The chemical reaction chamber may be characterized by two configurations. First, the chemical reaction chamber enables the introduction of a compound mixture, which may be in solid, liquid, gas, or multiphase form, the purpose of which is to support or enhance electromagnetic field and which specifically does not have any chemical interaction with the water. Second, the chemical reaction chamber enables the introduction of energy in a geometrically configured manner, in which the result of the treatment of the water molecules is to render the water molecule to have a greater probability to attract hydrated and/or conventional electrons to the adjacent areas of the water molecules, without a chemical reaction occurring between the water molecule and the electrons. The result of the treatment of the water molecules is to disrupt and break hydrogen bonds between the water molecules and enable the same molecule to receive, store, and transfer the electron-volt energy into their ten electrons, so that the treated water molecule is able to help generate hydrated and/or conventional electron energy into the adjacent areas of a treated system without a chemical reaction between the treated water molecule and the electron(s).

In the chemical reaction chamber, for a period after the treatment of the water molecules and generation of the electron energy containing, structurally altered gaseous water molecules, the electron energy containing, structurally altered gaseous water molecules can be introduced into an environment using the following deployment methods: direct injection and coarse bubble, fine bubble, microbubble, and nanobubble diffusion. In the environment, a separate chemical, non-chemical, or hybrid process may be occurring and heightened hydrated and/or conventional electron availability (either accepting or donating) may be useful in allowing and/or enhancing the speed and completion of such process. Either organically, such as the water molecule's advantage in electron transport in the mitochondria, or in various inorganic processes, such as, for example, the production of hydrogen alternative gasses, or the reduction of carbon dioxide equivalents ($CO_2e$), during the combustion of fossil fuels.

The method according to the present disclosure involves the introduction of the compound mixture, which may be in solid, liquid, gas, or multiphase form, the purpose of which is to support or enhance electromagnetic field and which specifically does not have any chemical interaction with the water. The structurally altered gaseous water molecules may be introduced using direct injection or coarse bubble, fine bubble, microbubble, or nanobubble diffusion into a plurality of chemical processes that use hydrated electrons, electrons, and the structurally altered gaseous water molecules for any purposes needed by the chemical process. The example chemical processes into which the structurally altered gaseous water molecules may be introduced may include fossil fuel and energy production, hydrogen alternative fuel and energy production, adenosine triphosphate (ATP) production, agriculture applications, all forms of water treatment including desalinization, contamination removal such as polymeric and non-polymeric compounds (e.g., PFAS), and the like, and both organic and inorganic compounds.

The method for deployment of structurally altered gaseous water molecules may be used for degradation of PFAS contained in various states of matter with excess electrons and the resulting hydrated electrons. The method involves diffusing the structurally altered gaseous water molecules into a matter (the chemical process) that can contain PFAS and other organic and inorganic contaminants in solid, liquid, and gaseous media. The molecular alterations are performed to generate and deploy the excess electrons, electron energy, and resulting hydrated electrons. The electrons are accommodated by the lengthening of the H—O bonds from 0.95 Angstroms up to 1.3 Angstrom and decreasing the H—O—H bond angle from 104.5° to as small as 94°. These changes alter the chemical properties of the media into which the structurally altered gaseous water molecules of the present disclosure may be infused, furthering the ability of the hydrated electrons to target the PFAS. These changes include but are not limited to a decrease in normal pure water pH (from 7.0 to about 6.5) and a shift in redox potential from 0 mV to about-200 mV. The negative oxidation/reduction potential (ORP) at a pH below 7 in the pure water confirms that excess electrons exist on their own without the negative ORP effect of dissolved anions in this water including the structurally altered gaseous water molecules. Hydrated electrons form when the excess electrons are injected into liquid water.

The structurally altered gaseous water molecules may be diffused into normal pure water where it has been demonstrated that the structurally altered gaseous water molecules impart their properties to the un-gassed normal pure water. The restructuring of normal water molecules by diffusion of the structurally altered gaseous water molecules into it has shown the following observed alterations in the structurally altered gaseous water molecule-diffused water allowing the accommodation of excess electrons. The first alteration is reduction in intermolecular hydrogen bonding between water molecules in liquid phase. Hydrogen bonding in water is a dynamic attraction between positively charged hydrogen atoms of one water molecule and negatively charged oxygen atoms of another water molecule. This occurs because of the difference in electronegativity between hydrogen and oxygen atoms. The second alteration is reduction in the dipole moment of the water treated with the structurally altered gaseous water molecules. The dipole moment is a measure of the separation of positive and negative electrical charges within a system. Water has a dipole moment because water has a bent structure and the electronegativity difference between atoms of oxygen and hydrogen. The third alteration is reduction in the ion-dipole force formed between ions and water. The ion-dipole force is a force of attraction between an ion and a neutral molecule that has a dipole. The fourth alteration is that the generation of the structurally altered gaseous water molecules results in formation of hydrated electrons from the surplus excess electrons provided by the infusion of the structurally altered gaseous water molecules.

These alterations reduce the tendency of the water molecules to "clump" through hydrogen bonding, and its dipole moment. The alterations also provide a reduction in the ion-dipole force formed between ions and water to facilitate the separation and passage of individual water molecules through ion water separation technologies used in the separation of ions (both soluble and insoluble) from process fluids and in the purification of water. With these changes provided by the method according to the present disclosure, the desirable effects on the chemical kinetics (speed of reaction) and thermodynamics (how far to completion the reactions may go) have been demonstrated. Passage of individual water molecules through water treatment processes (e.g., for the degradation of PFAS), separation processes, and membranes used for purification of water by altering the ion-ion, ion-water, and water-water interactions in solution have been demonstrated and documented in experiments.

Results from the experiments conclude a significant reduction in water and energy consumption and increased sustainability benefit when using the method according to the present disclosure in degradation of PFAS, as well as in brackish/seawater reverse osmosis desalinization applications. In the studies, efficiency improvements of 25% in salt removal efficiency have been documented with all other consumables being equal.

The method of the present disclosure generates enough of the structurally altered gaseous water molecules in proximity to the contaminants (e.g., PFAS) to drive the accompanying degradation reactions to completion. Results from the conducted studies further conclude a significant reduction in PFAS. More specifically, water with the structurally altered gaseous water molecules according to the present disclosure contains the surplus electrons and hydrated electrons. The method according to the present disclosure weakens the affinity of the water molecules around the hydrated electron giving the hydrated electron access to the carbon-fluorine (C—F) bonds in polymeric substances, such as PFAS, and degrading the polymeric substances such as PFAS to non-harmful compounds.

Some embodiments of the present disclosure may utilize purified water. The purified water is added to a chemical reaction chamber that contains an electrolyte, which may be in solid, liquid, or gaseous form, or a combination of the above. This mixture is subjected to a focused magnetic field using a magnetic field generator and an electric field to generate an altered, gaseous form of said purified liquid. The generated gas in the form of structurally altered gaseous water molecules can then be deployed directly to the desired chemical process using any of the following deployment methods: direct injection and coarse bubble, fine bubble, microbubble, and nanobubble infusion. In an example embodiment, the magnetic field generator may include one of the following: earth magnets, solenoids, electromagnets, and so forth. The structurally altered gaseous water molecule has been tested in a plurality of tests. The tests illustrate the example embodiments of the present disclosure.

Components involved in the method described in the present disclosure include water, water pretreatment equipment, a chemical reaction chamber (can contain solid, liquid, or gas compound mixtures, or combination of all), an electrolyte solution, a magnetic field generator, and electricity. Further components may include pressure regulators, an electrical inverter, solar panels, and a diffuser for diffusing gas using such deployment methods as direct injection and any of coarse bubble, fine bubble, microbubble, and nanobubble diffusion.

Water serves as the raw material from which the gas product (i.e., the structurally altered gaseous water molecules) is generated. Water pretreatment equipment is used to prepare the water for the chemical reaction chamber using such steps as conventional filtration, absorption, and purification. The chemical reaction chamber provides the reaction vessel that holds the solid, liquid, or gas compound mixtures, or combination of all and the purified water for the magnetic field to chemically convert the purified water into an altered gaseous form of the purified liquid. The chemical reaction chamber provides the medium for the magnetic field to align and impart its energy on the purified water mixed in the chemical reaction chamber to chemically generate the altered gaseous form of the water. The magnetic field generator, e.g., in the form of earth magnets, creates magnetic field to drive the chemical reaction that generates the altered gaseous form of water. Once generated, the gas containing the structurally altered gaseous water molecules can be deployed directly into the desired chemical process using any of the following deployment methods: direct injection and coarse bubble, fine bubble, microbubble, and nanobubble infusion.

Thus, the method of the present disclosure includes treating water in the chemical reaction chamber with an electromagnetic field while introducing energy into the chemical reaction chamber based on predetermined parameters (e.g., temperature, pressure, time, and so forth). This results in breaking hydrogen bonds and eventual change in physical properties of the water molecules, thereby generating the structurally altered gaseous water molecules which behave differently from water. Upon generation of the structurally altered gaseous water molecules, the structurally altered gaseous water molecules may be introduced into a water container where the structurally altered gaseous water molecules may interact with molecules of water and impart the behavior of the structurally altered gaseous water molecules to the molecules of water. Specifically, some hydrogen bonds in the molecules of water are disrupted, i.e., they become similar to the hydrogen bonds in the structurally altered gaseous water molecules. Thus, the structurally altered gaseous water molecules, when infused in water, are able to influence the structure of the molecules of water and, hence, provide some of their properties to the molecules of water. The resulting amount of structurally altered gaseous water molecules (i.e., the structurally altered gaseous water molecules and the molecules of water changed by the structurally altered gaseous water molecules) may facilitate electron energy transfer and form hydrated electrons when introduced into a chemical process.

The liquid form of the structurally altered gaseous water molecules infused in water may serve as a storage system for the structurally altered gaseous water molecules because the structurally altered gaseous water molecules maintain their properties in the liquid form. The structurally altered gaseous water molecules from the storage system can be used in a chemical process at a later time.

The structurally altered gaseous water molecules can be deployed directly into public and private influent water, industrial process water and wastewater streams to enhance the performance of the existing technology and in some cases eliminate the need for existing subcomponents and their corresponding capital and operational costs.

Referring now to the drawings, various embodiments are described in which like reference numerals represent like parts and assemblies throughout the several views. It should be noted that the reference to various embodiments does not limit the scope of the claims attached hereto. Additionally, any examples outlined in this specification are not intended to be limiting and merely set forth some of the many possible embodiments for the appended claims.

FIG. 1 illustrates a system 100 for deployment of structurally altered gaseous water molecules derived from water, according to an example embodiment. System 100 may include an apparatus 102 for generating structurally altered gaseous water molecules from water, a diffuser 104 for generating bubbles of a predetermined size from the structurally altered gaseous water molecules, and an injector 106 for introducing the bubbles into an environment of a chemical process 108.

The apparatus 102 for generating structurally altered gaseous water molecules from water may include a water source 110, a water pretreatment system 112, a chemical reaction chamber 114, an electric field generator 116, earth magnets 118, and pipelines 120. The apparatus 102 may also include pressure regulators. The electric field generator 116 may include an electrical inverter and solar panels.

The water source 110 may provide water as a raw material for generating the gaseous molecule product, i.e., the structurally altered gaseous water molecules. The water pretreatment system 112 may prepare the water for the chemical reaction chamber 114. The water pretreatment system 112 may include a filtration system, an absorption system, and a purification system to produce the purified water 122.

The chemical reaction chamber 114 may contain an electrolyte solution 124. The electrolyte solution 124 can be made using a mixture of a hydroxide salt and an acid salt. The purified water 122 can be provided to the chemical reaction chamber 114. The earth magnets 118 may generate a permanent focused magnetic field. The electric field generator 116 may generate an electromagnetic field. The focused magnetic field and the electrical field may drive chemical reaction that generates the structurally altered gaseous water molecules 126 from the purified water 122 supplied into the chemical reaction chamber 114. The electrolyte solution 124 may provide a medium for the focused magnetic field to align and impart energy of the focused magnetic field on the purified water mixed in with the electrolyte solution and, thereby, chemically generate the structurally altered gaseous water molecules 126 from the purified water 122. The temperature in the chemical reaction chamber 114 can be from 60 degrees to 120 degrees in Fahrenheit. The pressure in the chemical reaction chamber 114 can be from 1 atmosphere to 40 pounds per square inch gauge (psig).

The structurally altered gaseous water molecules 126 can be 99.9% hydrogen and oxygen combination in two parts of hydrogen to one part of oxygen ratio at the standard temperature of 68 degrees in Fahrenheit and pressure of 1 atmosphere (STP). The structurally altered gaseous water molecules 126 may have the O—H bond length between 0.95 and 1.3 angstroms and the H—O—H bond angle between 94 degrees and 104 degrees.

The molecular weight of the structurally altered gaseous water molecules 126 can be between 12.14 and 12.18 atomic mass units (AMUs) at STP. In comparison, the molecular weight of pure water vapor is 18 AMUs at STP. At STP, the relative density of the structurally altered gaseous water molecules 126 compared to dry air is 41.18%-42.00%. In comparison, relative density of pure water vapor compared to dry air is 62.19%. The structurally altered gaseous water molecules 126 may remain stable at pressure more than 300 psig.

When dissolved in pure water having 2 parts per million (ppm) of total dissolved solids (TDS) at 25 degrees Celsius, the structurally altered gaseous water molecules 126 may generate an ORP of approximately −50 to −360 mV and a pH of 6.1 to 6.8 in the resulting gas-water mixture. The ORP and pH may remain stable in a closed insoluble vessel for at least 30 days. In comparison, the pure water does not possess a stable negative ORP at a pH below 7.

When dissolved in pure water (2 ppm TDS at 25 degrees in Celsius), the structurally altered gaseous water molecules 126 may reduce the concentration of TDS from 2.0 ppm to 1.0 ppm, i.e., the reduction is 50%. Barring contamination, the concentration of TDS remains stable at 1 ppm in a closed insoluble vessel indefinitely.

The changes in structure and properties of the structurally altered gaseous water molecules 126 are caused by changes in electronic structure of the structurally altered gaseous water molecules 126 due to applying the focused magnetic field and the electrical field to the mixture of the electrolyte solution 124 and purified water 122.

The structurally altered gaseous water molecules 126 generated by the apparatus 102 may have a higher probability of attraction of electrons into areas adjunct to the structurally altered gaseous water molecules 126 than molecules of the water.

The consumption of power to generate 1 kilogram of the structurally altered gaseous water molecules may be less than 9.8 kilowatt-hours. For comparison, this amount of power is much lower than the theoretical minimum energy of 39.4 kilowatt-hours required to generate 1 kilogram of hydrogen, along with the corresponding amount of oxygen through conventional electrolysis. It should be noted that commercial electrolyzers typically operate at efficiencies ranging from 70% to 82%, resulting in an actual energy requirement of approximately 50 to 55 kilowatt-hours per kilogram of hydrogen produced.

Upon the generation of the structurally altered gaseous water molecules 126 by the apparatus 102, the structurally altered gaseous water molecules 126 may be provided to the diffuser 104 to generate bubbles of a predetermined size. The bubbles may include the structurally altered gaseous water molecules 126.

Upon the generation of the bubbles, the bubbles that include the structurally altered gaseous water molecules 126 may be provided to the injector 106. The injector 106 may introduce the bubbles into an environment of the chemical process 108. Upon being injected into the chemical process 108, the structurally altered gaseous water molecules 126 may facilitate electron transfers during the chemical process 108, thereby increasing output of the chemical process 108. In an example embodiment, the temperature of the environment during the introduction of the bubbles may be between 33 degrees and 150 degrees Fahrenheit.

In an example embodiment, the chemical process 108 may include degradation of polymeric substances in contaminated water. In an example embodiment, a ratio of a volume of the bubbles and a volume of the polymeric and non-polymeric substances may be between 0.005 and 0.38. In some example embodiments, the polymeric substances and non-polymeric may include PFAS.

In an example embodiment, the predetermined size of the bubbles may exceed 3,000,000 nanometers. Upon being infused in the contaminated water, the bubbles may cause a reduction of the concentration of the polymeric and non-polymeric substances by 98.4% in 60 minutes.

In some example embodiments, the predetermined size of the bubbles may range between 100,000 nanometers and 3,000,000 nanometers. Upon being infused in the contaminated water, the bubbles may cause a reduction of a concentration of the polymeric and non-polymeric substances by 58.7% in 90 minutes.

In an example embodiment, the predetermined size of the bubbles may be between 200 nanometers and 100,000 nanometers. Upon being infused in the contaminated water, the bubbles may cause a reduction of the concentration of the polymeric and non-polymeric substances by 76.6% in 60 minutes.

In some example embodiments, the predetermined size of the bubbles may be less than 200 nanometers. Upon being infused in the contaminated water, the bubbles may cause a reduction of the concentration of the polymeric and non-polymeric substances by 73.3% in 60 minutes.

Figure 2:
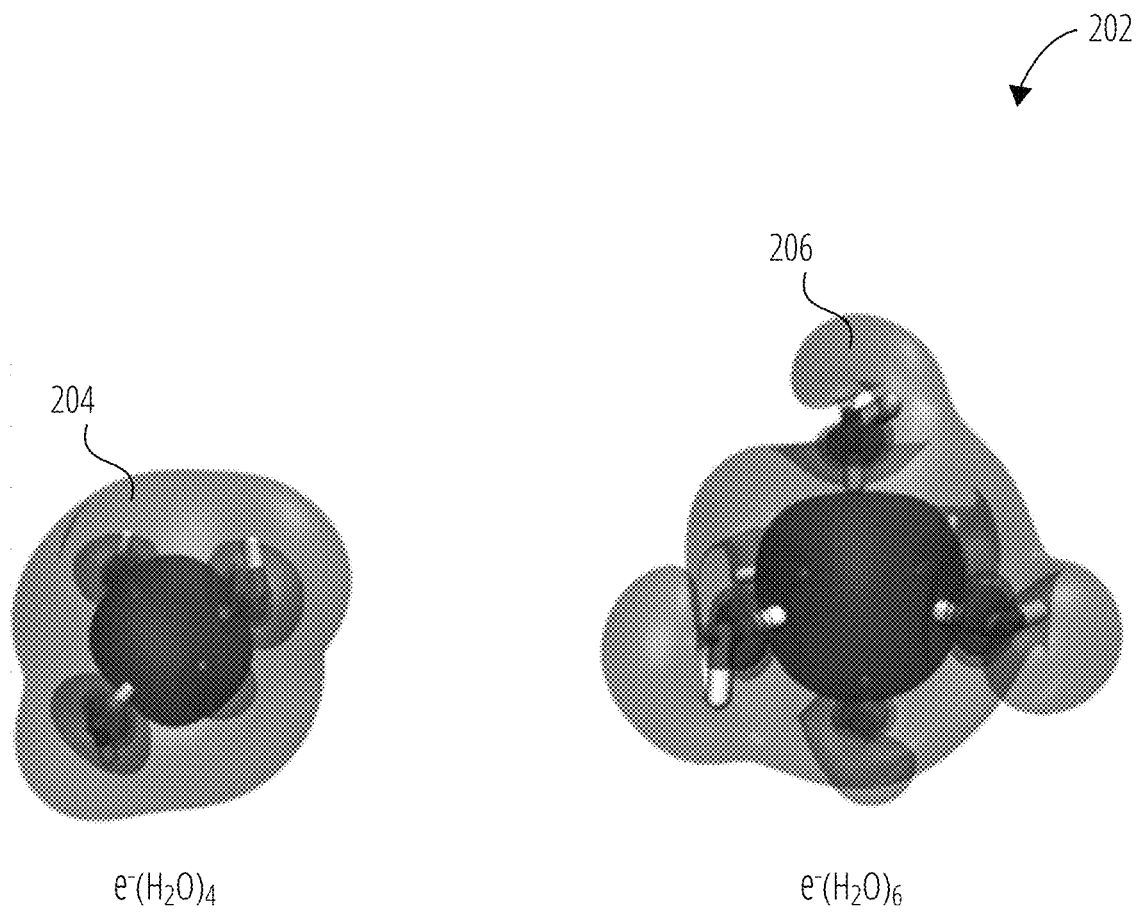
FIG. 2 illustrates hydrated electrons, according to an example embodiment.

FIG. 2 is a diagram 202 showing examples of hydrated electrons. The structurally altered gaseous water molecules 126 of the present disclosure contain the surplus electrons and resulting hydrated electrons. The method of the present disclosure weakens the affinity of the water molecules around the hydrated electron giving it access to the carbon-fluorine (C—F) bonds in PFAS and degrading the PFAS to non-harmful compounds. FIG. 2 shows four water molecules 204 plus an excess electron and six water molecules 206 plus an excess electron.

Figure 3:
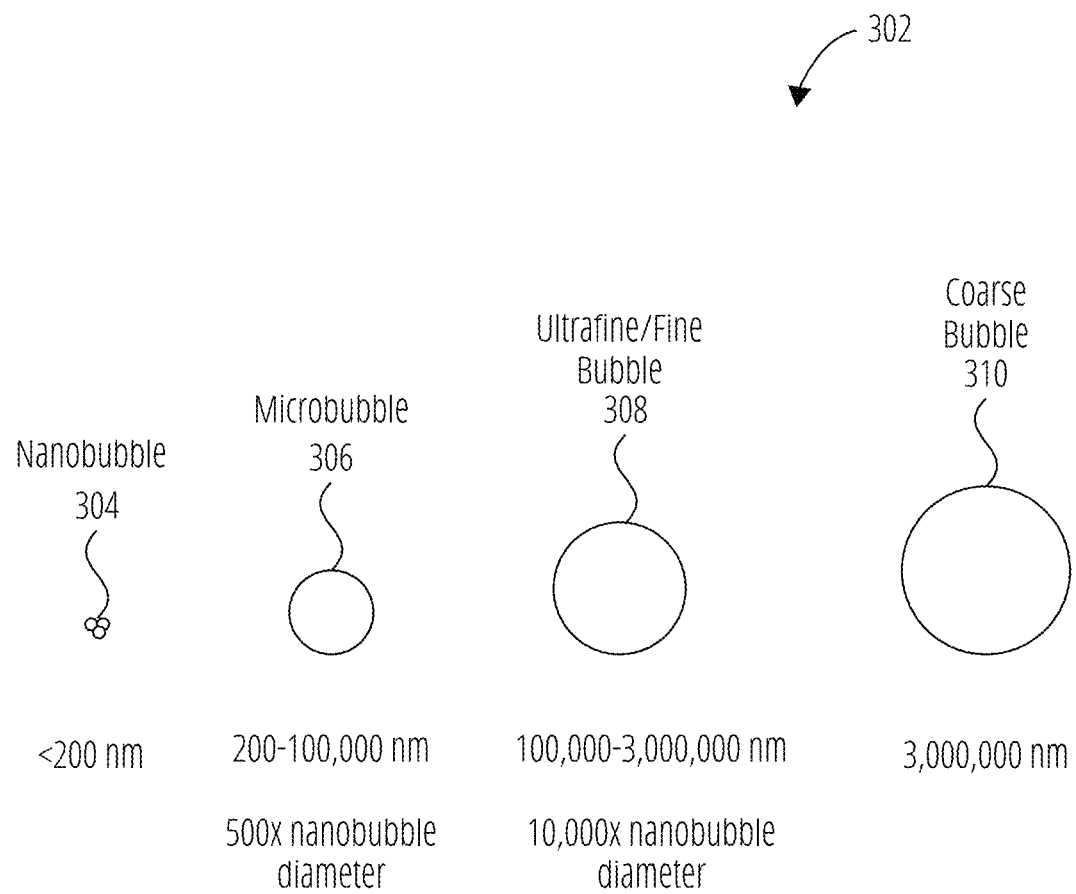
FIG. 3 shows a schematic diagram illustrating bubbles of various sizes, according to an example embodiment.

FIG. 3 shows a schematic diagram 302 illustrating bubbles of various sizes, according to an example embodiment. Nanobubbles 304 may be a size of less than 200 nanometers. Microbubbles 306 may be 500 times larger than the nanobubbles 304 and may have the size of between 200 nanometers and 100,000 nanometers. Ultrafine/fine bubbles 308 may be 10,000 times larger than the nanobubbles 304 and may have the size of between 100,000 nanometers and 3,000,000 nanometers. Coarse bubbles 310 may have the size of 3,000,000 nanometers or greater.

Referring again to FIG. 1, the diffuser 104 may be used to produce bubbles of the required size. The diffuser 104 can be selected from commercially available options for producing nanobubbles 304, microbubbles 306, ultrafine/fine bubbles 308, or coarse bubbles 310.

The bubbles have a larger surface area than a non-bubbled substance. The structurally altered gaseous water molecules 126 in the form of the bubbles have a larger surface area per a volume unit than the structurally altered gaseous water molecules 126 is a non-bubbled form. Due to the larger surface area, the structurally altered gaseous water molecules 126 in the form of the bubbles provide the increased degradation of polymeric and non-polymeric substances in contaminated water as compared to the structurally altered gaseous water molecules 126 is a non-bubbled form.

Figure 4:
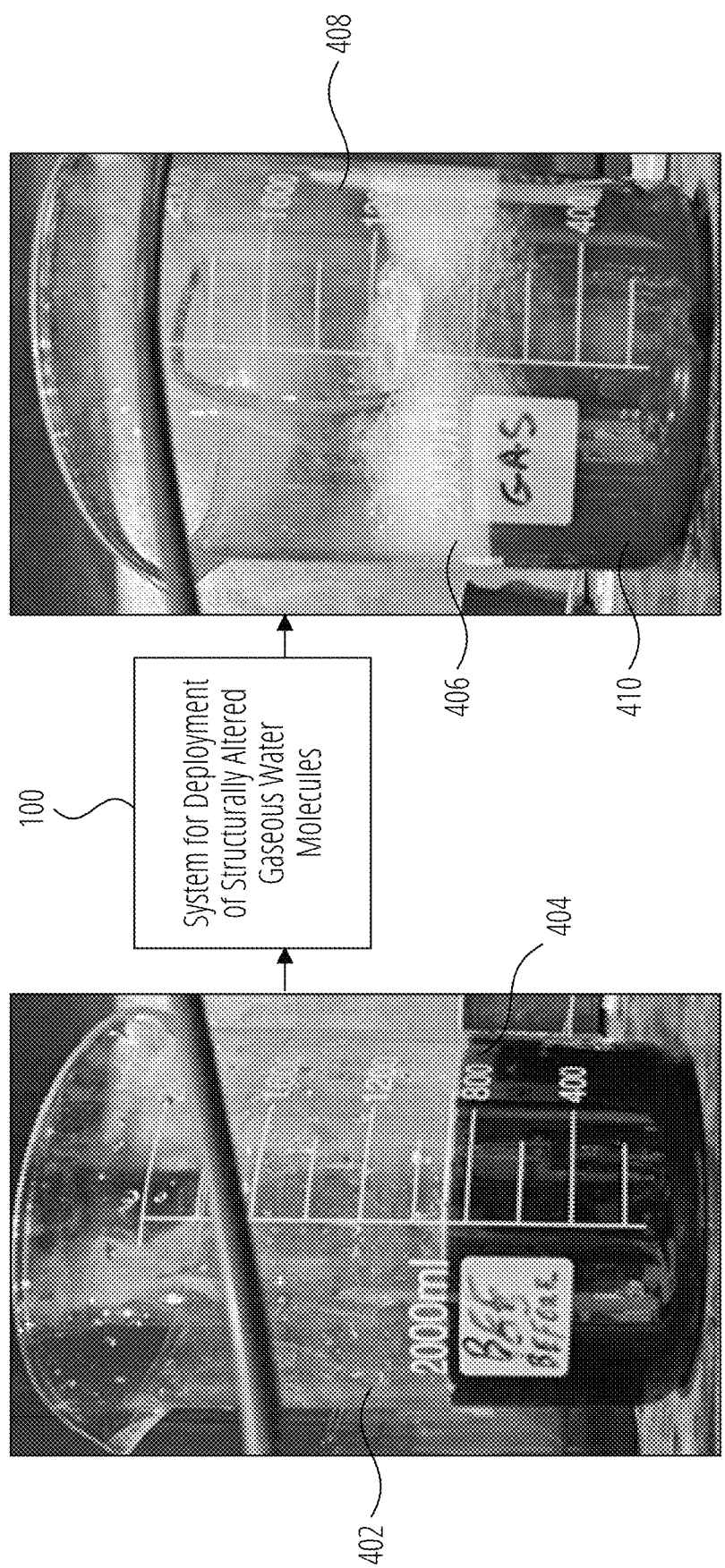
FIG. 4 illustrates deployment of structurally altered gaseous water molecules in the form of coarse bubbles for destruction of PFAS in landfill leachate, according to an example embodiment.

FIG. 4 illustrates deployment of structurally altered gaseous water molecules in the form of coarse bubbles for destruction of PFAS in landfill leachate, according to an example embodiment. Landfill leachate is the liquid that has seeped through solid waste in a landfill and extracted soluble dissolved or suspended materials in the process of seeping.

FIG. 4 shows a vessel 402 containing contaminated water 404, where the contaminant is PFAS. The color of the contaminated water 404 was dark brown. The contaminated water 404 was treated using the system 100 for deployment of structurally altered gaseous water molecules. Specifically, the structurally altered gaseous water molecules in the form of coarse bubbles 406 were introduced into the contaminated water 404. The size of the coarse bubbles 406 may be equal or exceed 3,000,000 nanometers.

Upon introduction of the structurally altered gaseous water molecules in the form of coarse bubbles 406 into the contaminated water 404 with PFAS, the structurally altered gaseous water molecules in the form of coarse bubbles 406 caused destruction of the PFAS in the contaminated water 404. FIG. 4 further shows a vessel 408 with result water 410, which is the contaminated water 404 treated using the system 100. Upon being infused in the contaminated water 404, the coarse bubbles 406 caused a reduction of the concentration of the PFAS by 98.4% in 60 minutes.

Accordingly, in the result water 410 obtained upon treating the contaminated water 404 with the structurally altered gaseous water molecules in the form of coarse bubbles 406, the amount of the PFAS was reduced by 98.4%, which resulted in change of color of result water 410 from dark brown to brown.

Figure 5:
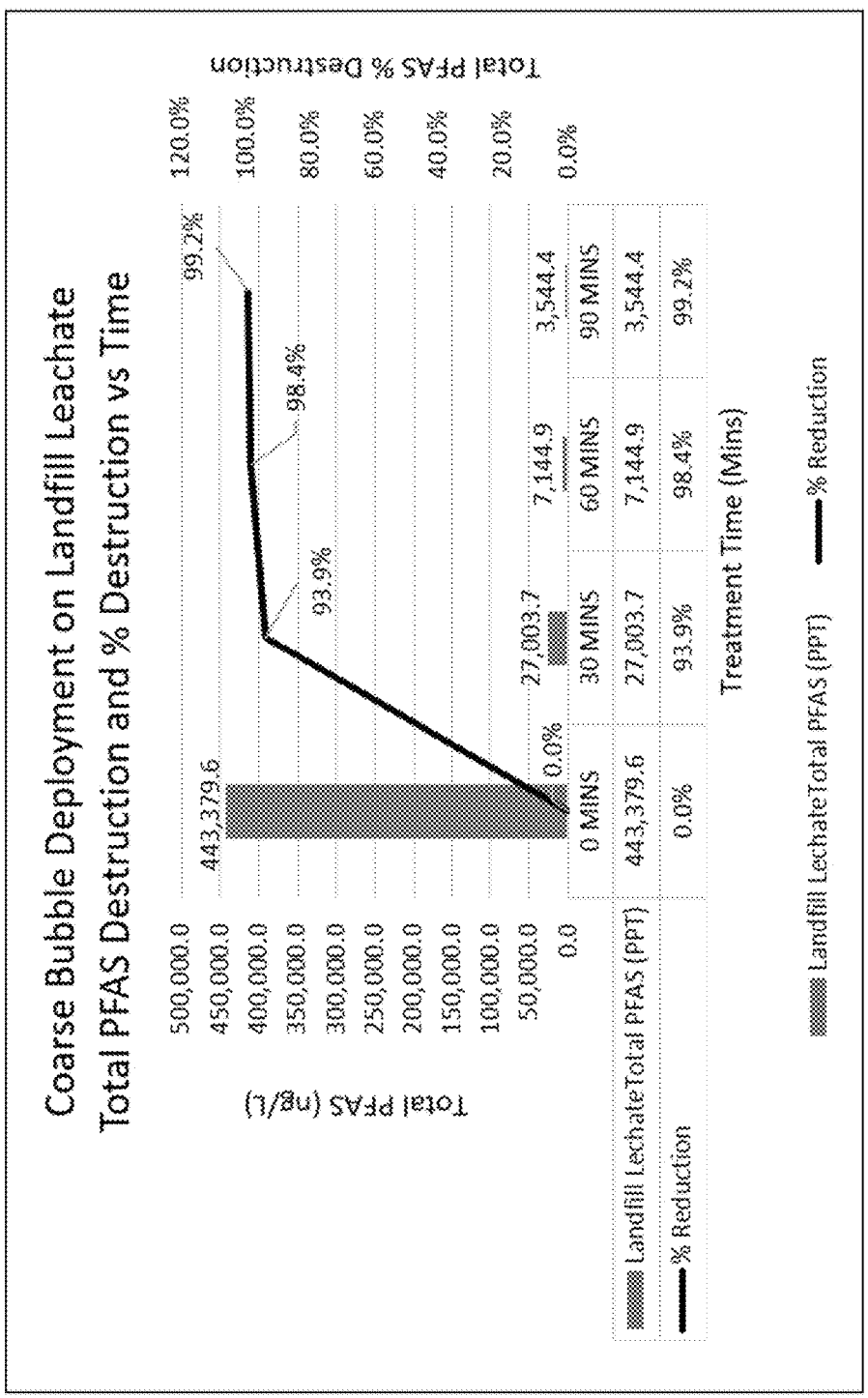
FIG. 5 is a plot that illustrates coarse bubble deployment on landfill leachate and total destruction of PFAS and percent of destruction of PFAS over time, according to an example embodiment.

FIG. 5 is a plot 502 that illustrates coarse bubble deployment on landfill leachate and shows total destruction of PFAS and percent of destruction of PFAS over time, according to an example embodiment. The contaminated water used for the experiment is landfill leachate.

As shown in FIG. 5, before the deployment of the structurally altered gaseous water molecules in the form of coarse bubbles for treating the contaminated water, the amount of PFAS in the contaminated water was 443,379.6 ng/L. Upon introduction of the structurally altered gaseous water molecules in the form of coarse bubbles into the contaminated water, the structurally altered gaseous water molecules in the form of coarse bubbles caused destruction of the PFAS in the contaminated water. The process resulted in reduction of the amount of PFAS in the contaminated water up to 27,003.7 ng/L (by 93.9% compared to the initial amount of PFAS) in 30 minutes, up to 7,144.9 ng/L (by 98.4%) in 60 minutes, and up to 3,544.4 ng/L (by 99.2%) in 90 minutes.

Figure 6:
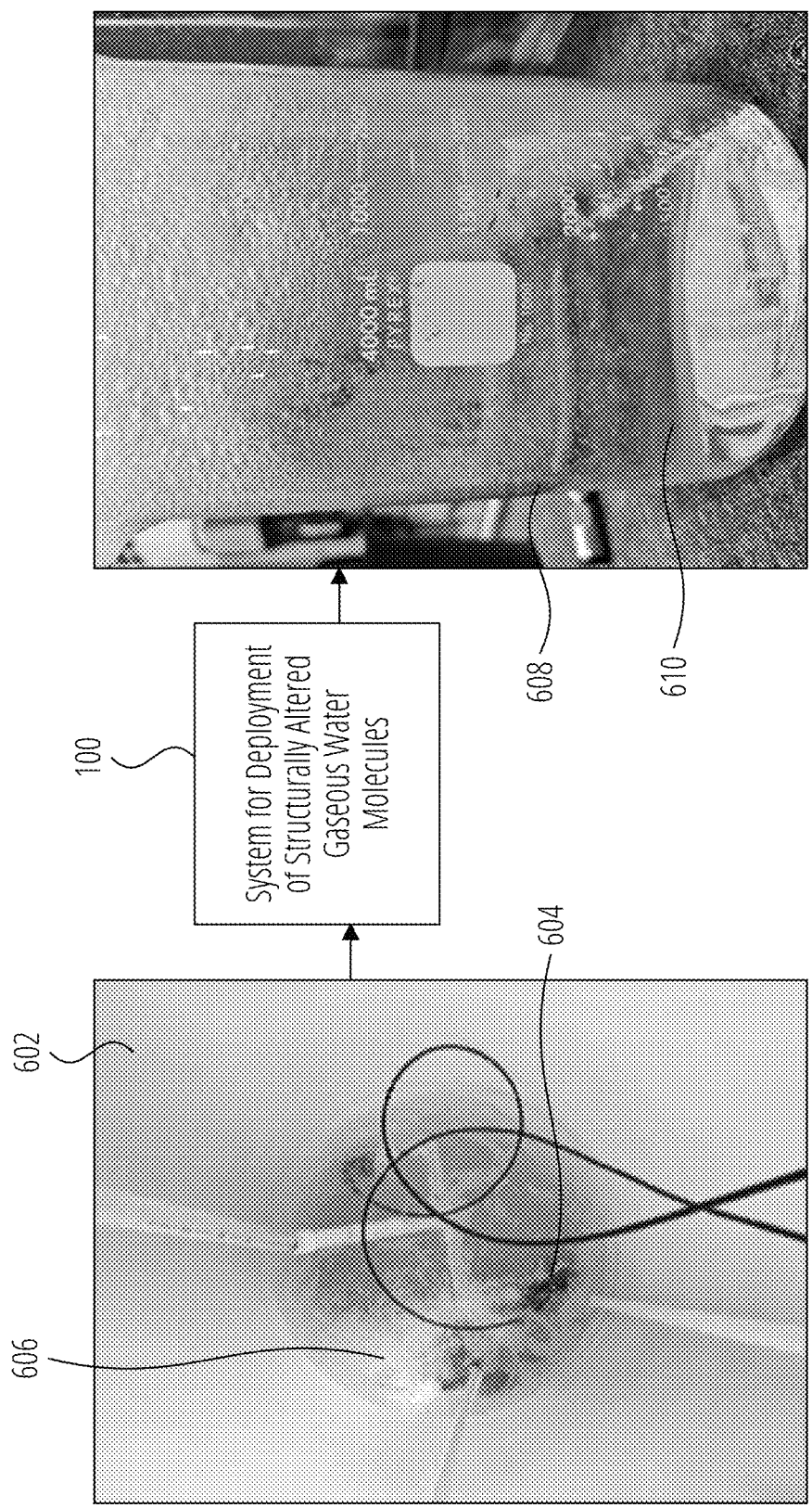
FIG. 6 illustrates deployment of structurally altered gaseous water molecules in the form of fine bubbles for destruction of PFAS in industrial wastewater, according to an example embodiment.

FIG. 6 illustrates deployment of structurally altered gaseous water molecules in the form of fine bubbles for destruction of PFAS in industrial wastewater, according to an example embodiment. FIG. 6 shows a vessel 602 containing contaminated water 604, where the contaminant is PFAS. The color of the contaminated water 604 was dark brown.

The contaminated water 604 was treated using system 100 for deployment of structurally altered gaseous water molecules. Specifically, the structurally altered gaseous water molecules in the form of fine bubbles 606 were introduced into the contaminated water 604. The size of the fine bubbles 606 may be between 100,000 nanometers and 3,000,000 nanometers.

Upon introduction of the structurally altered gaseous water molecules in the form of fine bubbles 606 into the contaminated water 604 with PFAS, the structurally altered gaseous water molecules in the form of fine bubbles 606 caused destruction of the PFAS in the contaminated water 604. FIG. 6 further shows a vessel 608 with result water 610, which is the contaminated water 604 treated using system 100. Upon being infused in the contaminated water 604, the fine bubbles 606 caused a reduction of the concentration of the PFAS by 58.7% in 90 minutes.

Accordingly, in the result water 610 obtained upon treating the contaminated water 604 with the structurally altered gaseous water molecules in the form of fine bubbles 606, the amount of the PFAS was reduced by 58.7%, which resulted in change of color of result water 610 from dark brown to light brown.

Figure 7:
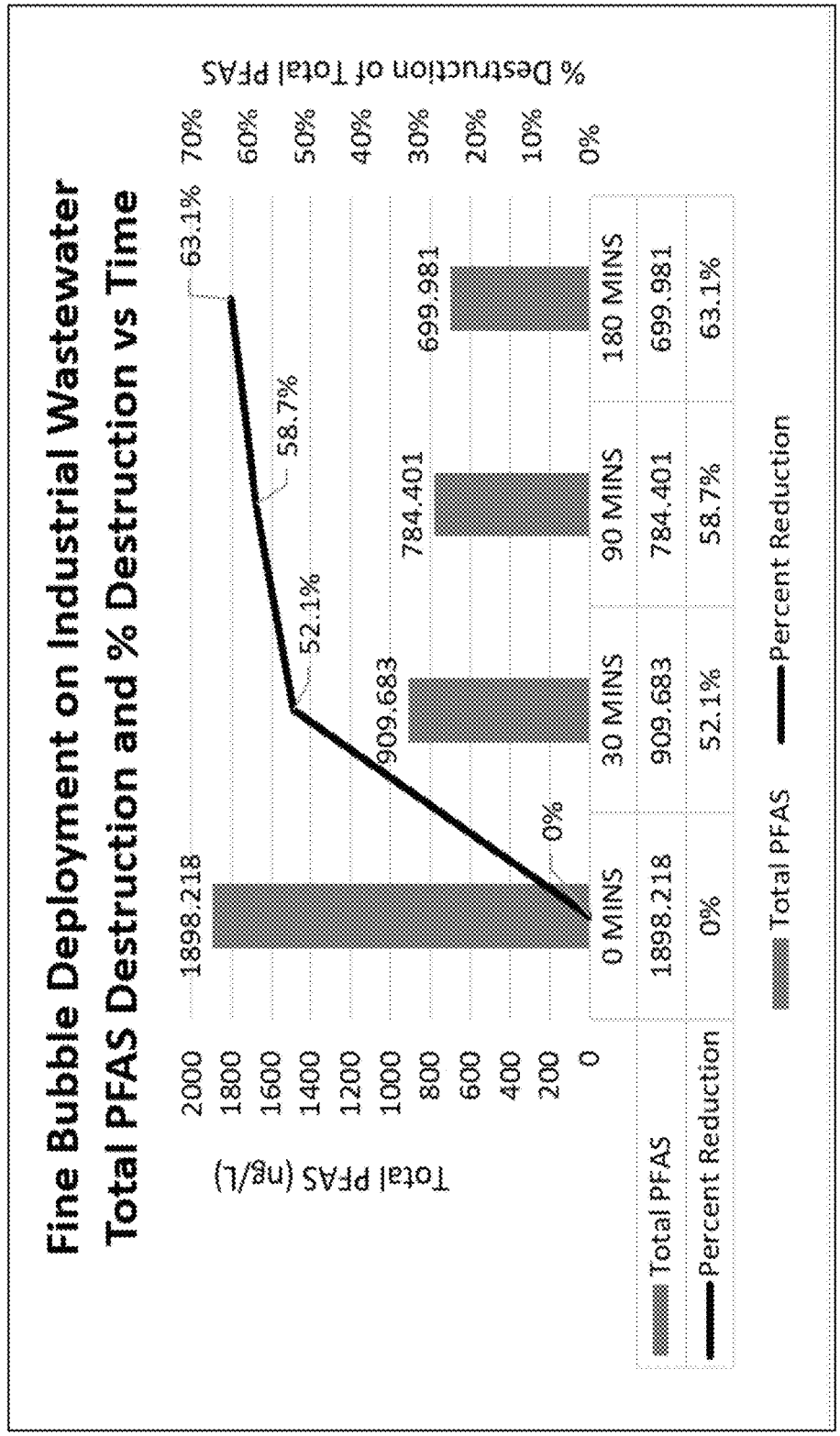
FIG. 7 is a plot that illustrates fine bubble deployment in industrial wastewater and total destruction of PFAS and percent of destruction of PFAS over time, according to an example embodiment.

FIG. 7 is a plot 702 that illustrates fine bubble deployment on industrial wastewater and shows total destruction of PFAS and percent of destruction of PFAS over time, according to an example embodiment. The contaminated water used for the experiment is industrial wastewater.

As shown in FIG. 7, before the deployment of the structurally altered gaseous water molecules in the form of fine bubbles for treating the contaminated water, the amount of PFAS in the contaminated water was 1,898.218 ng/L. Upon introduction of the structurally altered gaseous water molecules in the form of fine bubbles into the contaminated water, the structurally altered gaseous water molecules in the form of fine bubbles caused destruction of the PFAS in the contaminated water. The process resulted in a reduction of the amount of PFAS in the contaminated water up to 909.683 ng/L (which by 52.1% as compared to the initial amount of PFAS) in 30 minutes, up to 784.401 ng/L (by 58.7%) in 90 minutes, and up to 699.981 ng/L (by 63.1%) in 180 minutes.

Figure 8:
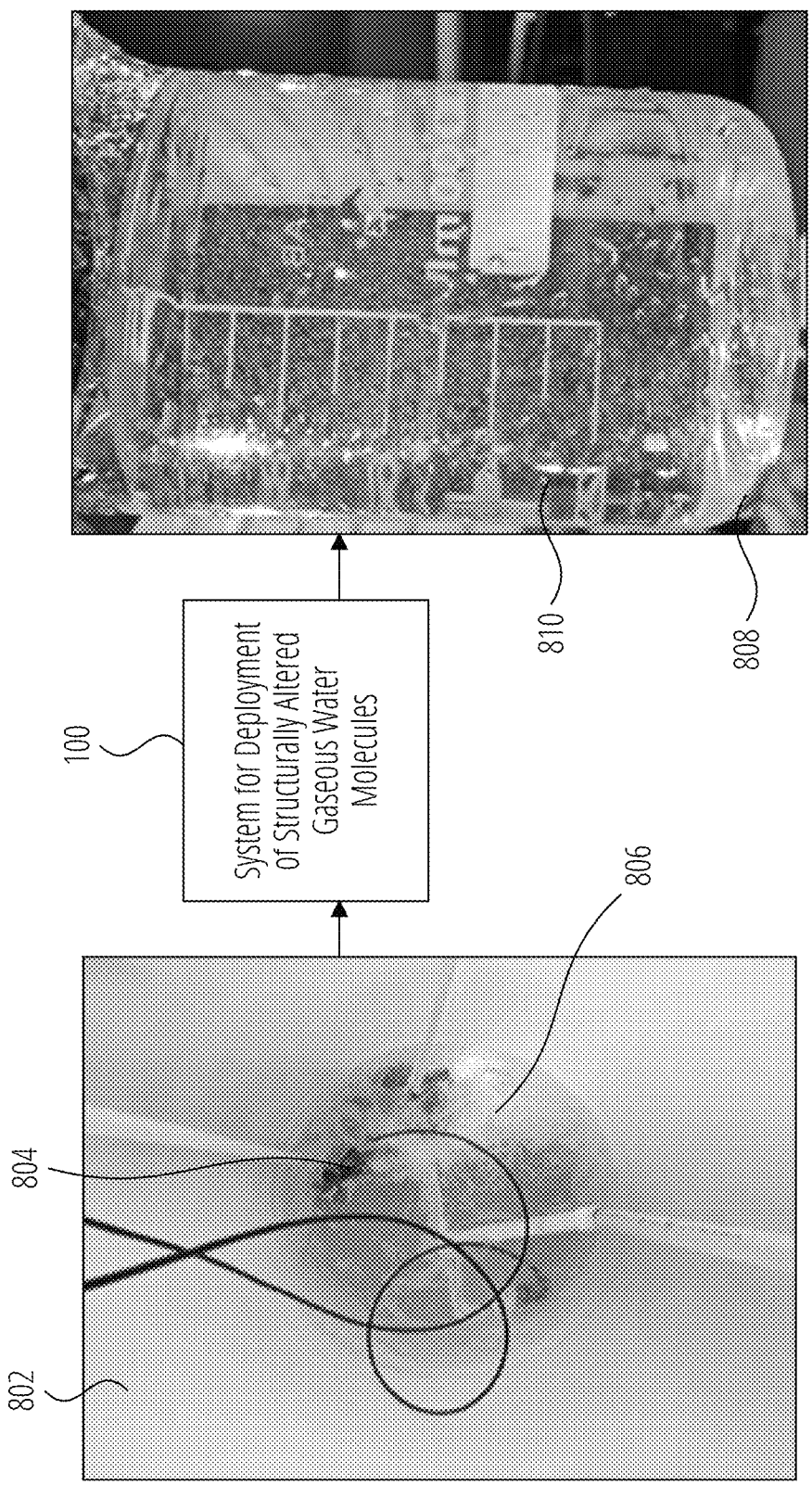
FIG. 8 illustrates deployment of structurally altered gaseous water molecules in the form of microbubbles for destruction of PFAS in industrial wastewater, according to an example embodiment.

FIG. 8 illustrates deployment of structurally altered gaseous water molecules in the form of microbubbles for destruction of PFAS in industrial wastewater, according to an example embodiment. FIG. 8 shows a vessel 802 containing contaminated water 804, where the contaminant is PFAS. The color of the contaminated water 804 was dark brown.

The contaminated water 804 was treated using system 100 for deployment of structurally altered gaseous water molecules. Specifically, the structurally altered gaseous water molecules in the form of microbubbles 806 were introduced into the contaminated water 804. The size of the microbubbles 806 may be between 200 nanometers and 100,000 nanometers.

Upon introduction of the structurally altered gaseous water molecules in the form of microbubbles 806 into the contaminated water 804 with PFAS, the structurally altered gaseous water molecules in the form of microbubbles 806 caused destruction of the PFAS in the contaminated water 804. FIG. 8 further shows a vessel 808 with result water 810, which is the contaminated water 804 treated using system 100. Upon being infused in the contaminated water 804, the microbubbles 806 caused a reduction of the concentration of the PFAS by 76.6% in 60 minutes.

Accordingly, in the result water 810 obtained upon treating the contaminated water 804 with the structurally altered gaseous water molecules in the form of microbubbles 806, the amount of the PFAS was reduced by 76.6%, which resulted in the color change of result water 810 from dark brown to almost transparent and very light brown water.

Figure 9:
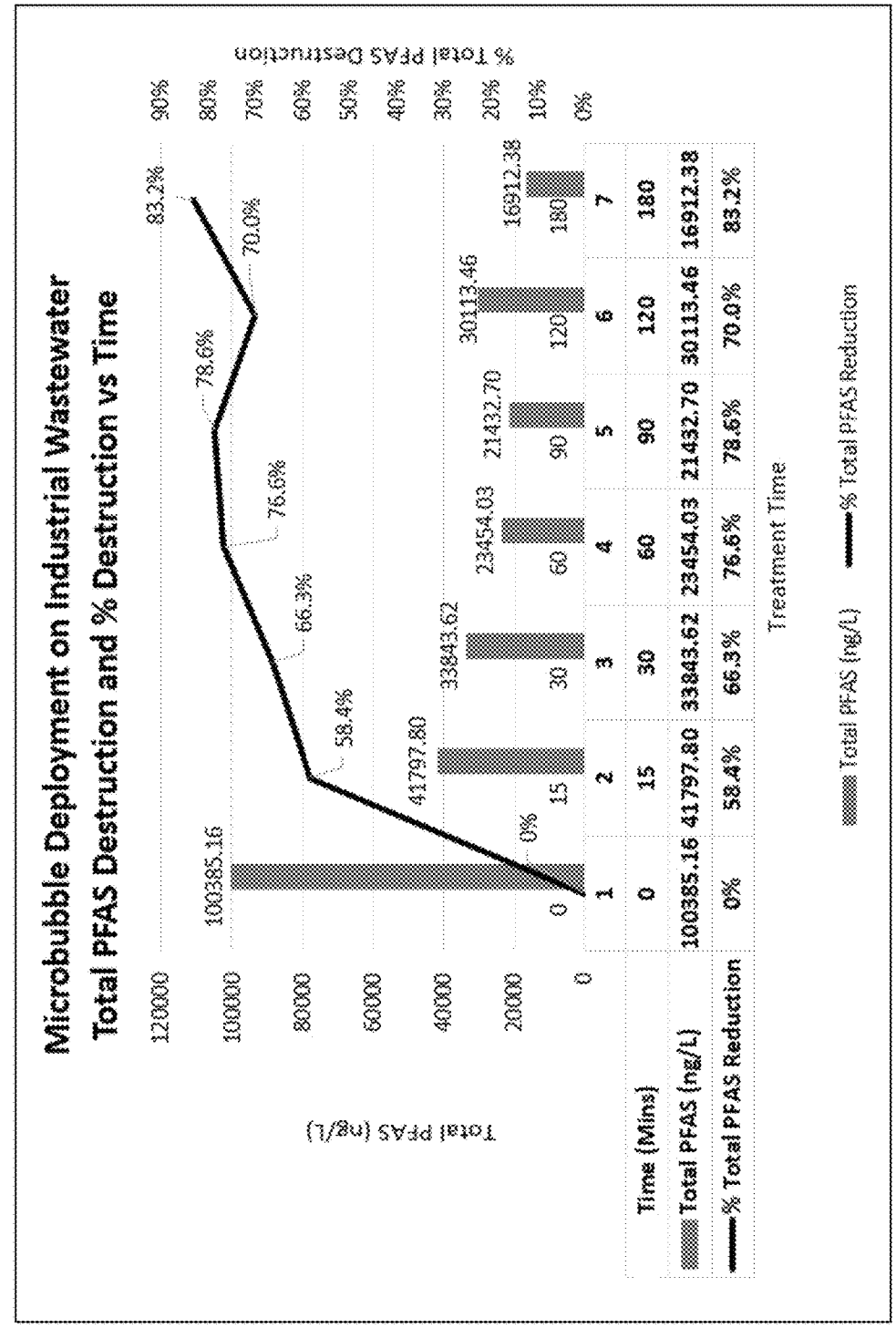
FIG. 9 is a plot that illustrates microbubble deployment in industrial wastewater and total destruction of PFAS and percent of destruction of PFAS over time, according to an example embodiment.

FIG. 9 is a plot 902 that illustrates microbubble deployment on industrial wastewater and shows total destruction of PFAS and percent of destruction of PFAS over time, according to an example embodiment. The contaminated water used for the experiment is industrial wastewater.

As shown in FIG. 9, before the deployment of the structurally altered gaseous water molecules in the form of microbubbles for treating the contaminated water, the amount of PFAS in the contaminated water was 100,385.16 ng/L. Upon introduction of the structurally altered gaseous water molecules in the form of microbubbles into the contaminated water, the structurally altered gaseous water molecules in the form of microbubbles caused destruction of the PFAS in the contaminated water. The process resulted in reduction of the amount of PFAS in the contaminated water up to 41,797.80 ng/L (which by 58.4% as compared to the initial amount of PFAS) in 15 minutes, up to 38,843.62 ng/L (by 66.3%) in 30 minutes, up to 23,424.03 ng/L (by 76.6%) in 60 minutes, up to 21,432.70 ng/L (by 78.6%) in 90 minutes, up to 30,113.46 ng/L (by 70.0%) in 120 minutes, and up to 16,912.38 ng/L (by 83.2%) in 180 minutes.

Figure 10:
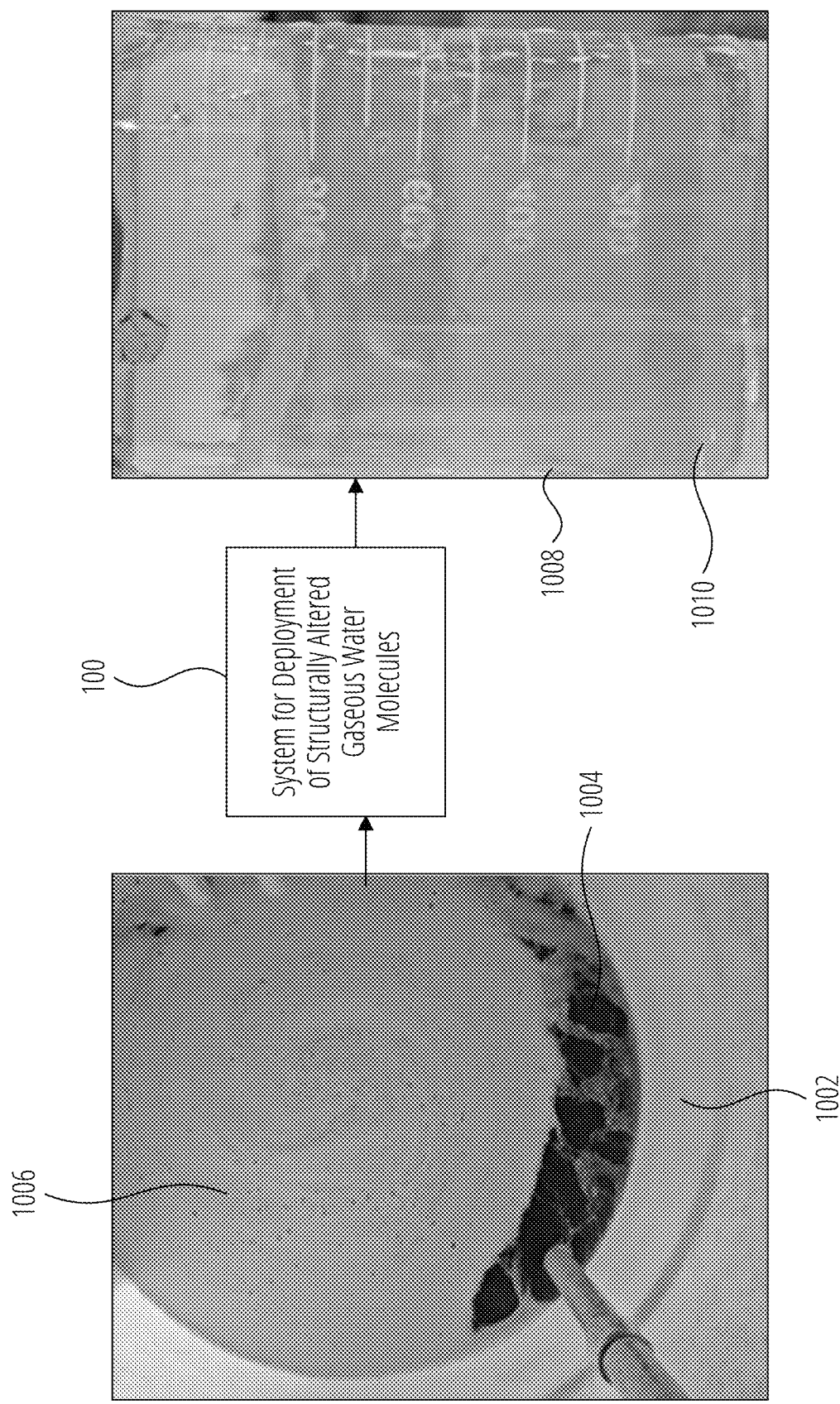
FIG. 10 illustrates deployment of structurally altered gaseous water molecules in the form of nanobubbles for destruction of PFAS in landfill leachate, according to an example embodiment.

FIG. 10 illustrates deployment of structurally altered gaseous water molecules in the form of nanobubbles for destruction of PFAS in landfill leachate, according to an example embodiment. FIG. 10 shows a vessel 1002 containing contaminated water 1004, where the contaminant is PFAS. The color of the contaminated water 1004 was dark brown.

The contaminated water 1004 was treated using system 100 for deployment of structurally altered gaseous water molecules. Specifically, the structurally altered gaseous water molecules in the form of nanobubbles 1006 were introduced into the contaminated water 1004. The size of the nanobubbles 1006 may be less than 200 nanometers.

Upon introduction of the structurally altered gaseous water molecules in the form of nanobubbles 1006 into the contaminated water 1004 with PFAS, the structurally altered gaseous water molecules in the form of nanobubbles 1006 caused destruction of the PFAS in the contaminated water 1004. FIG. 10 further shows a vessel 1008 with result water 1010, which is the contaminated water 1004 treated using the system 100. Upon being infused in the contaminated water 1004, the nanobubbles 1006 caused a reduction of a concentration of the PFAS by 73.3% in 60 minutes.

Accordingly, in the result water 1010 obtained upon treating the contaminated water 1004 with the structurally altered gaseous water molecules in the form of nanobubbles 1006, the amount of the PFAS was reduced by 73.3%, which resulted in change of color of result water 1010 from dark brown to almost transparent and very light brown water.

Figure 11:
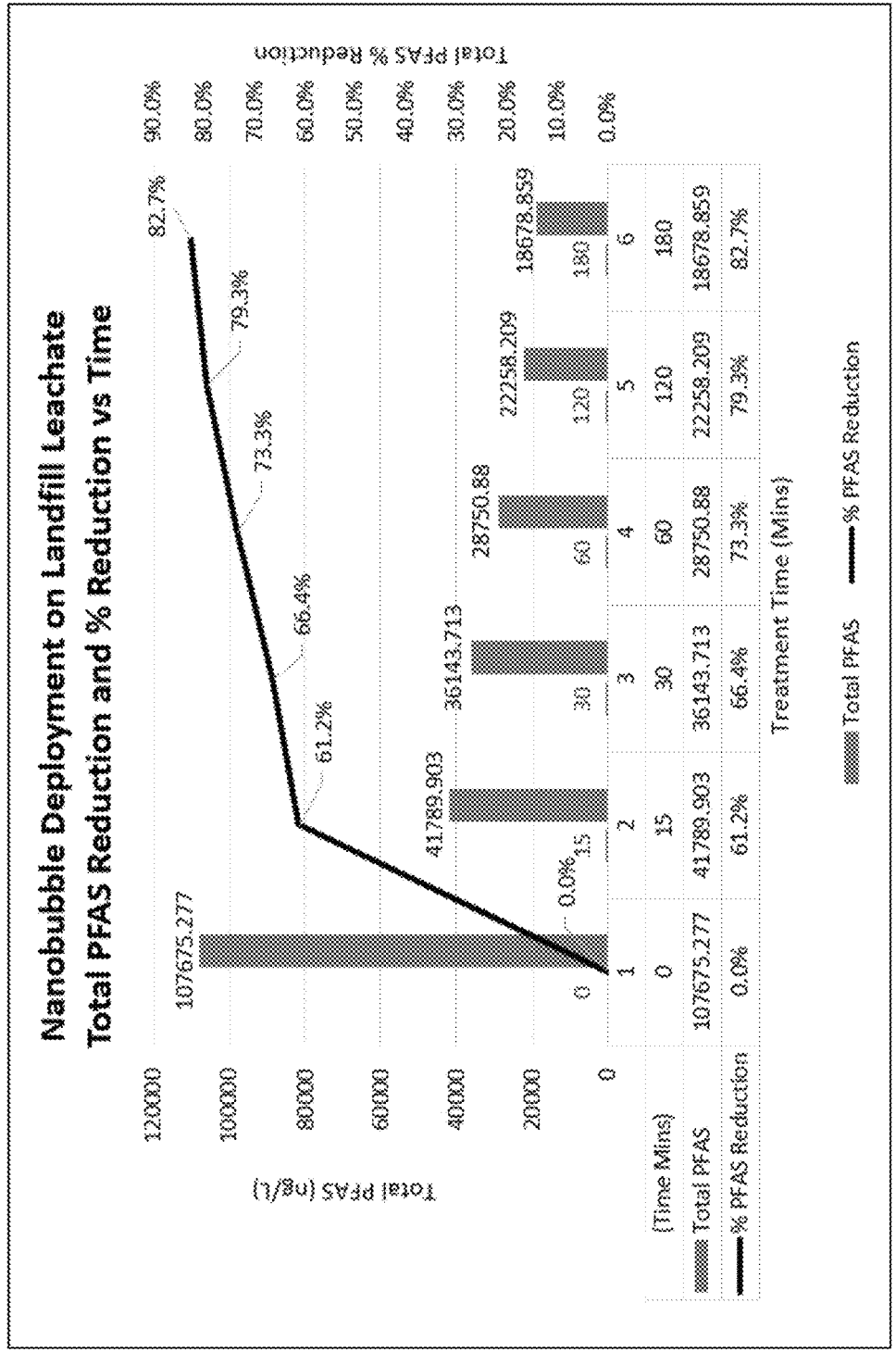
FIG. 11 is a plot that illustrates coarse bubble deployment on landfill leachate and total destruction of PFAS and percent of destruction of PFAS over time, according to an example embodiment.

FIG. 11 is a plot 1102 that illustrates coarse bubble deployment on landfill leachate and shows total destruction of PFAS and a certain percentage of destruction of PFAS over time, according to an example embodiment. The contaminated water used for the experiment is landfill leachate.

As shown in FIG. 11, before the deployment of the structurally altered gaseous water molecules in the form of nanobubbles for treating the contaminated water, the amount of PFAS in the contaminated water was 107,675.277 ng/L. Upon introduction of the structurally altered gaseous water molecules in the form of nanobubbles into the contaminated water, the structurally altered gaseous water molecules in the form of nanobubbles caused destruction of the PFAS in the contaminated water. The process resulted in reduction of the amount of PFAS in the contaminated water up to 41,789.903 ng/L (which by 61.2% as compared to the initial amount of PFAS) in 15 minutes, up to 36,143.713 ng/L (by 66.4%) in 30 minutes, up to 28,750.88 ng/L (by 73.3%) in 60 minutes, up to 22,258.209 ng/L (by 79.3%) in 120 minutes, and up to 18,678.859 ng/L (by 82.7%) in 180 minutes.

FIG. 12 is a table illustrating calorimetry test results of the bomb calorimetry study, according to an example embodiment. The bomb calorimetry study was conducted to confirm that combustion of the gas product of the present disclosure, i.e., the structurally altered gaseous water molecules, provides a higher amount of energy in kJ per kg as compared to combustion of hydrogen.

The gas product of the present disclosure, when combusted, generates 21.2% more energy in kJ/kg as compared to hydrogen. At present, green hydrogen (i.e., hydrogen produced by the electrolysis of water, using renewable electricity) costs $1-$2 dollars per kilogram to manufacture. The manufacturing of blue hydrogen (i.e., hydrogen that is manufactured by natural gas reforming coupled with carbon capture and storage) costs $5-$7 per kilogram. The cost of manufacturing the gas of the present disclosure is $0.658 per kilogram. The gas requires no oxygen stripping process like grey, brown, green, or blue hydrogen. The gas generates no $NO_x$, $SO_x$, or $CO_2$ emissions. Nearly 100% of the burned fuel that includes the structurally altered gaseous water molecules is captured and rejuvenated in a closed system compared to a conventional hydrogen burning system where the exhaust products are not captured. The gas product can be stored and transported or generated on board and used in realtime. The combustion of the gas product provides no toxic exposure to operators or users. There are no toxins generated during the combustion process. The raw materials for the gas product (i.e., water) are collected and recycled indefinitely. The footprint for 100 MW gas plant (i.e., the plant working on the structurally altered gaseous water molecules of the present disclosure) is 0.0098 sq km or 0.004 sq mi. The footprint for 100 MW hydrogen plant is 3 times larger or more. The footprint for 100 MW wind farm is 25 sq km or 10 sq mile. The footprint for 100 MW solar panel field is 25 sq km or 10 sq mile.

In the bomb calorimetry study illustrated in FIG. 12, the heat of combustion was measured using a modified ASTM D240 procedure, which enables the combustion of gases rather than liquids or solids as is normally the case. For hydrogen gas, oxygen was supplied in stoichiometric excess. For the gas of the present disclosure (i.e., the structurally altered gaseous water molecules), no additional oxygen or air was supplied. In each test, the vessel was filled with sample gas twice, released to remove any residual air, and refilled a third time. The results are presented in Table 1202 shown in FIG. 12. Table 1202 shows the heat of combustion of hydrogen and the gas. Based on the measured heat of combustion, the energy increase provided by the combustion of the gas of the present disclosure was determined to be 21.2%.

FIG. 13 and FIG. 14 illustrate characteristics of the gas (i.e., the structurally altered gaseous water molecules) according to the present disclosure. FIG. 13 is a table 1302 illustrating results of the standard ASTM D 1945 test for analysis of the gas according to the present disclosure by gas chromatography. FIG. 14 is a table 1402 illustrating characteristics of natural gas 1404, hydrogen 1406, and gas 1408 of the present disclosure.

The structurally altered gaseous water molecule is a molecule consisting of hydrogen and oxygen in a 2:1 ratio. It is not a mixture of $H_2$ and $O_2$ gases and not hydrogen peroxide or conventional pure water or water vapor. The structurally altered gaseous water molecule exists as a gas at standard temperature that can be pressured up to 300 psig, while maintaining its stability. The structurally altered gaseous water molecule has no geographic limitations for production. Unlike hydrogen, the structurally altered gaseous water molecule does not back propagate. Similarly to fuels, a certain pressure of the structurally altered gaseous water molecule existing as a gas may have to be maintained. This gas can be generated as it is used and can be stored in a way other gases used in combustion turbines are stored. The gas creates a flame when it burns but does not create explosion like hydrogen.

A plurality of tests to study the structurally altered gaseous water molecules has been performed. Some results of the tests are illustrated in FIG. 15-FIG. 20. The results proved that the generation of the structurally altered gaseous water molecules is scalable, sustainable, and safe.

The gas of the present disclosure has structural differences as compared to divalent hydrogen, divalent oxygen, and pure water, as illustrated in FIG. 15-FIG. 20 discussed below.

The structural changes made to the water molecules include changes in the bond angle and bond length and neutralization of the hydrogen bonding found in regular water. This is accomplished by imparting sufficient focused energy on regular water to overcome the collective bond energies. Structural changes to provide molecules of the same outer valence orbitals with lone pairs of electrons in their structure (for example, water) may allow certain normally "liquid" molecules to exist as gases and at standard temperature and pressure after these said structural changes. A lone pair of electrons is a pair of valence electrons that are not shared with another atom in a covalent bond and is also called an unshared pair or non-bonding pair. These structural changes and the phenomena are described by the molecular orbital theory.

Figure 15:
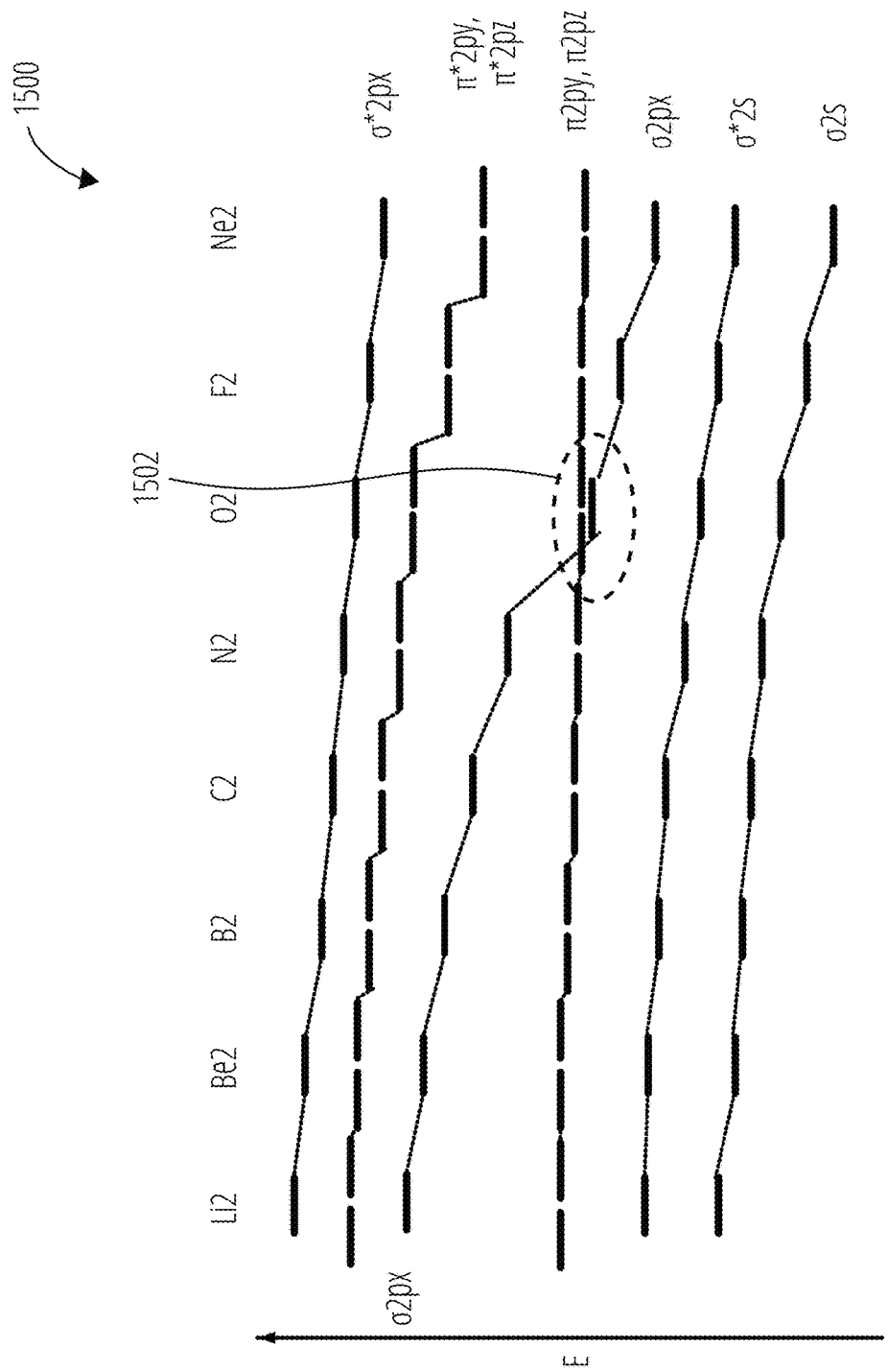
FIG. 15 is a diagram showing energy levels of molecular orbitals of homonuclear diatomic molecules of elements of the second period in the periodic table.

FIG. 15 is a diagram showing energy levels energy levels 1500 of molecular orbitals of homonuclear diatomic molecules of elements of the second period in the periodic table. In the molecular orbital theory, there is known a phenomenon called σ-π (sigma-pi) mixing. This phenomenon influences existing s and p molecular orbitals by imparting electromagnetic energy. In the case of oxygen, the sigma-2px, pi-2py 1502 and pi-2pz orbitals are close enough to alter the respective stability at the molecular level. Thus, the energy levels of these orbitals can supersede each other with small amounts of focused energy input. The superseding in the energy levels has a direct effect on the molecular wavefunction of a molecule, effective nuclear charge, atomic radius of the oxygen in molecules, and causes significant changes in the molecular structure.

According to the molecular orbital theory, the electrons are delocalized throughout the entire molecule to allow atomic orbitals to form molecular orbitals. This effect allows creating both bonding and anti-bonding interactions for filling orbitals. Accordingly, this allows prediction of the arrangement of electrons in molecules.

The de-localization of electrons and change in energy levels (substantiated by the molecular orbital theory as described above) can be imparted by the process described with reference to FIG. 1. Application of the focused magnetic field and the electric field on the purified water feedstock in the presence of the electrolyte solution is the driver for the structural changes to purified water feedstock. The structural changes convert the purified water from a liquid form to a gaseous form with a two hydrogen to one oxygen ratio. These structural changes allow molecules of the gaseous form to exist as a stable gas at STP.

The structural changes include changes in the bond angle and bond length and neutralization of hydrogen bonding by deploying sufficient energy to neutralize the hydrogen bonding in the pure water. Structural changes similar to the ones that allow molecules of the same outer valence orbitals with lone pairs of electrons in their structure to exist as both gases and liquids, are observed in nature. For example, pure water ($H_2O$) with molecular weight of 18.0 g/mol has a bond angle of 104.5 degrees and an O—H bond length of 0.9572 angstroms and exists as a liquid at STP. Hydrogen sulfide ($H_2S$) has the same outer valence structure as oxygen and a molecular weight of 34.1, a bond angle of 92.1 degrees and an S—H bond length of 1.34 angstroms. However, in contrast to the pure water, the hydrogen sulfide exists as a gas at STP.

Figure 16:
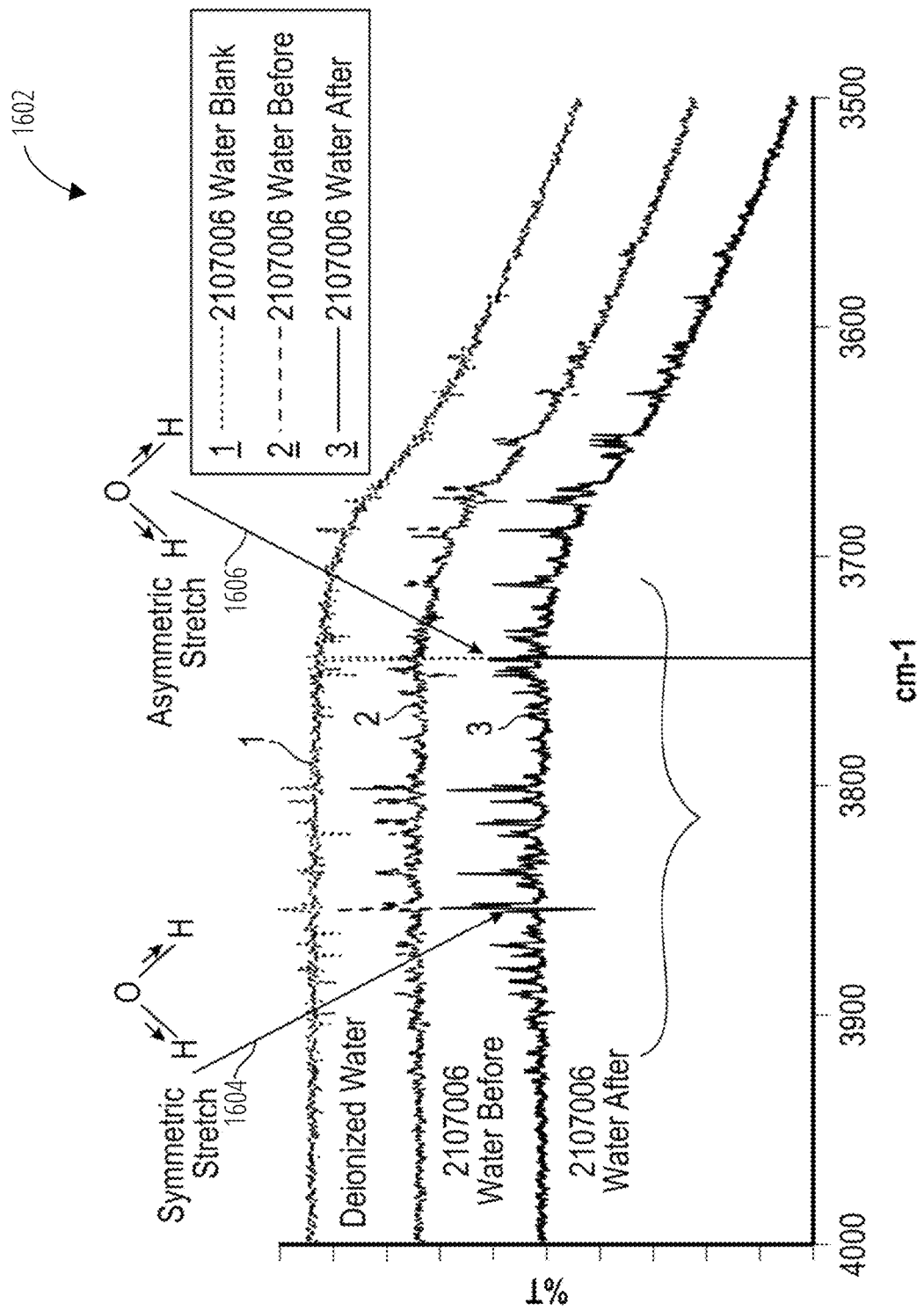
FIG. 16 is a plot of the Fourier Transform Infrared (FTIR) transmittance spectra of deionized water, a pure water before infusion with the structurally altered gaseous water molecule, and a pure water after infusion with the structurally altered gaseous water molecule, according to an example embodiment.

FIG. 16 is a plot 1602 of the FTIR transmittance spectra of deionized water, a pure water before (WB) infusion with the structurally altered gaseous water molecule, and a pure water after (WA) infusion with the structurally altered gaseous water molecule in the region of 3500-4000 inverse centimeters ($cm^{-1}$).

Figure 17:
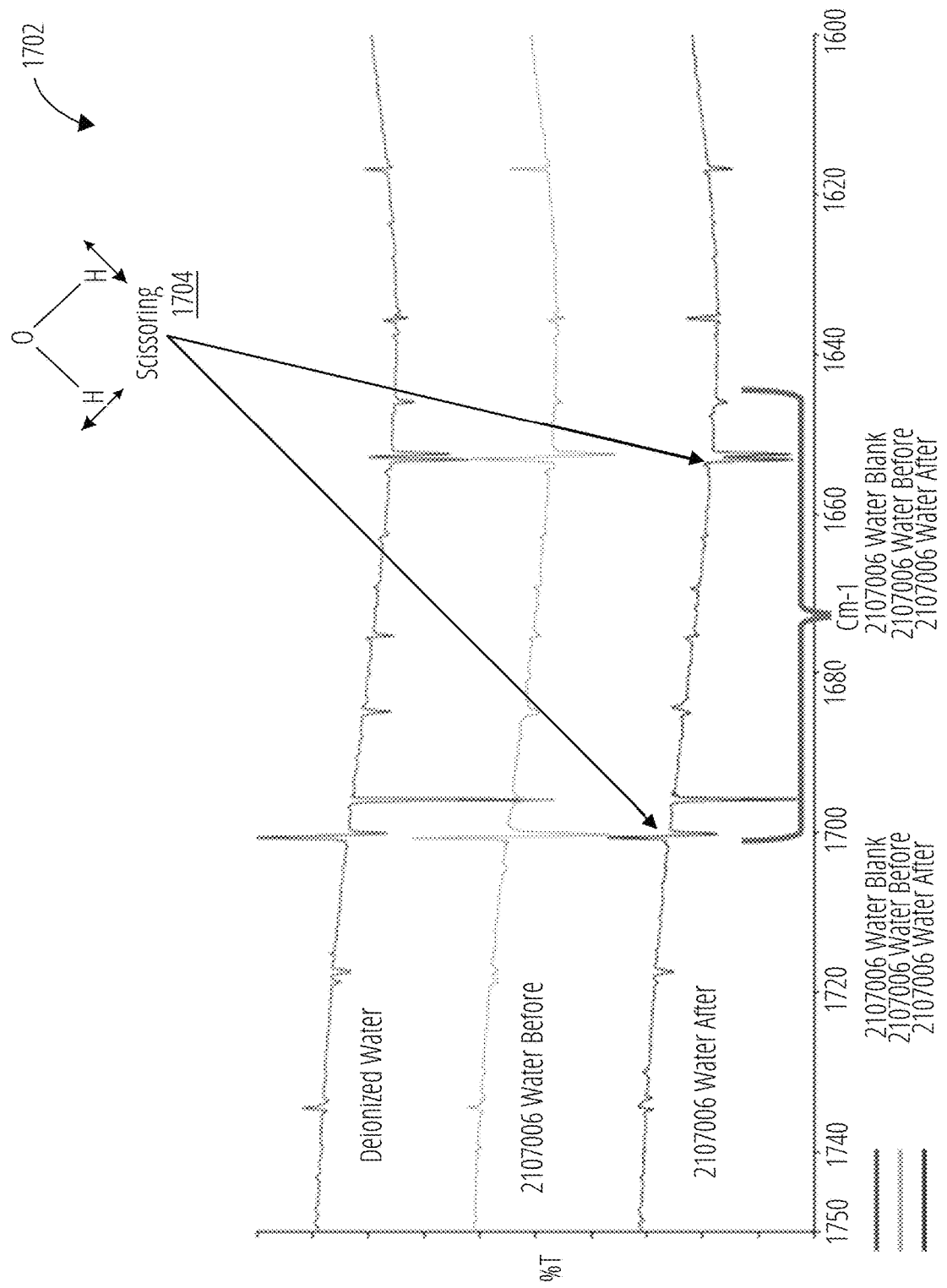
FIG. 17 is a plot of the FTIR transmittance spectra of deionized water, pure water before infusion, and pure water after infusion in the region of 1600-1750 $cm^{-1}$, according to an example embodiment.

FIG. 17 is a plot 1702 of the FTIR transmittance spectra of deionized water, WB, and WA in the region of 1600-1750 $cm^{-1}$. FIG. 16 and FIG. 17 show the actual structural changes to the water molecule's bond length (stretch) and bond angle resulting from treatment of the gas of the present disclosure. Structural changes are referenced by arrows toward the changes in downward "dips" at specific transmittance (% T) and time interval ($cm^{-1}$). Specifically, plot 1602 and plot 1702 show differences in bands corresponding to the symmetrical stretch 1604 and asymmetrical stretch 1606 in bond length and bands corresponding to the bond angle "scissoring" 1704.

Figure 18:
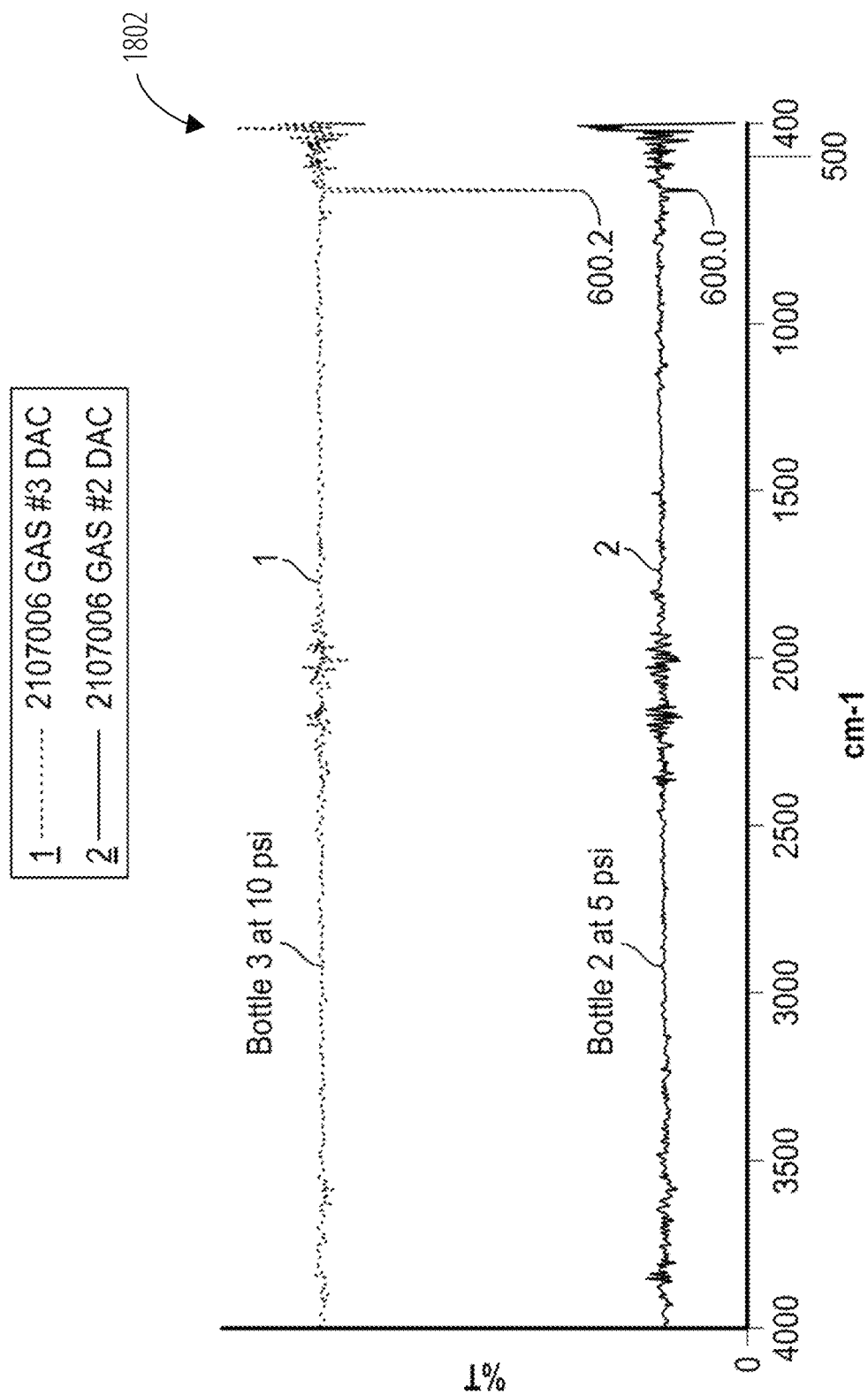
FIG. 18 are plots of FTIR molecular spectra of the structurally altered gaseous water molecule, according to an example embodiment.

FIG. 18 are plots 1802 of FTIR molecular spectra of the structurally altered gaseous water molecule at pressures of 10 per square inch (psi) and 5 psi. The plots 1802 show a structural response at about 600 $cm^{-1}$ vs. percent transmittance (% T), which indicates change in structure. Specifically, the peaks at 600.2 $cm^{-1}$ and 600.0 $cm^{-1}$ in the plots 1802 show that the structurally altered gaseous water molecule has a unique structure different from the structure of the pure water vapor.

In comparison, regular water or divalent gases (such as $H_2$ or $O_2$)—do not show any structural response in the FTIR 600 $cm^{-1}$ range because an FTIR molecular spectra of the pure water vapor has no peaks in the area around 600 $cm^{-1}$. Additionally, the peaks at 600 $cm^{-1}$ cannot be related to a diatomic gas because the FTIR of divalent gases does not include peaks. Furthermore, the peaks at 600.2 $cm^{-1}$ and 600.0 $cm^{-1}$ are directly proportional to the observed molecule pressures recorded during the analysis. Accordingly, the 600 $cm^{-1}$ response observed in the gas of the present disclosure increases proportionally with pressure, thus reconfirming that the infrared response data at about 600 $cm^{-1}$ is proportional and real. This proportionality substantiates that the peaks at 600.2 $cm^{-1}$ and 600.0 $cm^{-1}$ are caused by the pure structurally altered gaseous water molecule generated by the system 100.

Neutralization of hydrogen bonding in the pure water feedstock allows the resulting gaseous HOH molecule to be released (evaporated) from the chemical reaction chamber via restructuring the pure water in the gaseous form. The neutralization of the hydrogen bond and increase in evaporation is also observed in water that has been infused with structurally altered gaseous water molecules.

Figure 19:
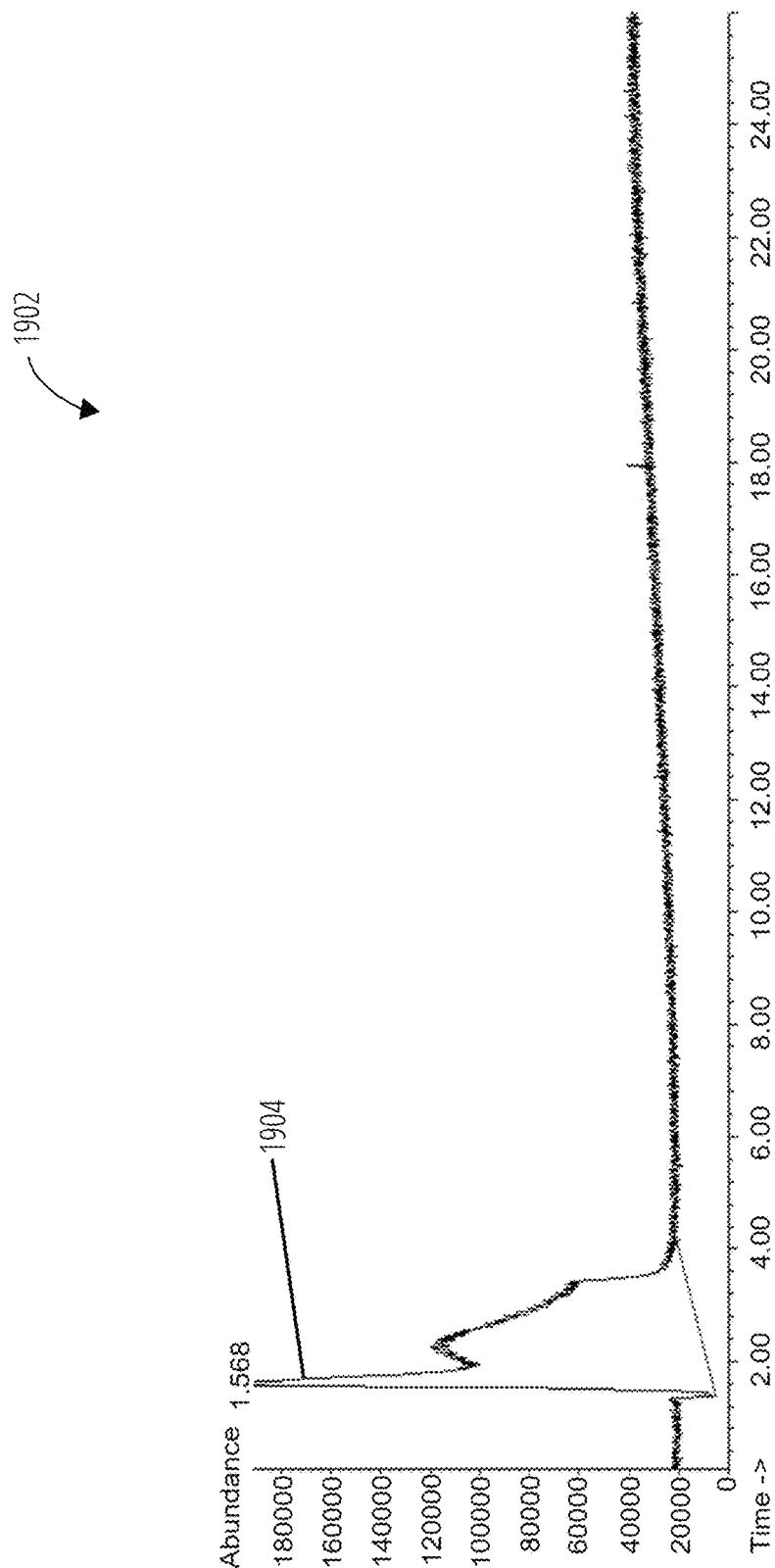
FIG. 19 is an expanded plot of a chromatogram of water after infusion with the structurally altered gaseous water molecule, according to an example embodiment.
Figure 20:
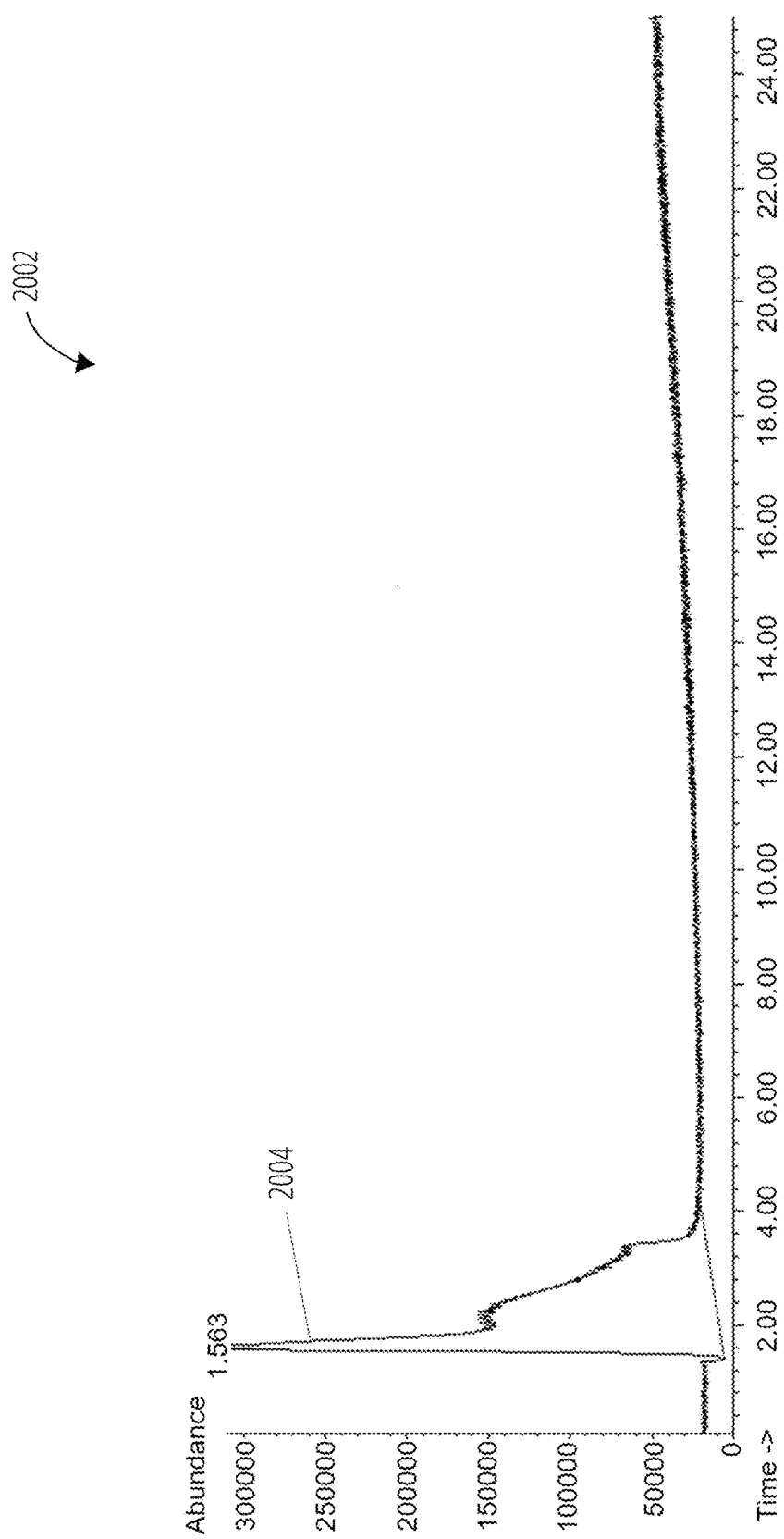
FIG. 20 is an expanded plot of a gas chromatography-mass spectrometry chromatogram of water before infusion with the structurally altered gaseous water molecule, according to an example embodiment.

FIG. 19 shows an expanded plot 1902 of the chromatogram 1904 and FIG. 20 shows an expanded plot 2002 of the chromatogram 2004. Plot 1902 and plot 2002 indicate a significant increase in the abundance (from 200,000 to 320,000) at about 1.56 time interval, as well as the total abundance under the curve. This increase is directly proportional to the increased abundance of the gas in the water treated with the gas of the present disclosure. Specifically, the first peak in the 1.56 range on the X axis (Time) shows an approximate 40% increase in value of abundance (Y axis) from 200,000 to 320,000 or about 37.5% in the chromatogram 1904 (WA-water after infusion with the structurally altered gaseous water molecule) as compared to the chromatogram 2004 (WB—the water before the infusion). The second peak in the 2.20 range on the X axis (Time) shows an increase in abundance (Y Axis) from 120,000 for WB to 155,000 for WA or about 22.6%. These differences indicate structural change of the water treated by the structurally altered gaseous water molecules. Specifically, the differences indicate differences in H—O bond length, H—O—H bond angle, and decreasing influence of hydrogen bond with the increase in vapor release in the GC-MS sample chamber.

Thus, the FTIR plots 1602, 1702, and 1802 and chromatography plot 1902 and plot 2002 indicate that wave number, wave harmonic, angular frequency, angular wavelength, and angular period associated with the electromagnetic energy and geometry the structurally altered gaseous water molecule are different than those resulting from any related electrolysis technique employed to produce hydrogen ($H_2$), oxygen ($O_2$), or any other molecule containing these elements.

The measured and observed changes in the molecular structure of the gas of the present disclosure shown in FIG. 16-FIG. 20 enable the gas to possess non-polar behavior and accommodate more efficient electron sharing according to the molecular orbital theory.

In an example embodiment, the system and method of the present disclosure may include deployment of the structurally altered gaseous water molecule to enhance production of Adenosine Tri Phosphate (ATP) in living organisms using any of the following deployment systems: direct injection and coarse, fine, micro, and nanobubble diffusion. The system and method of the present disclosure provide an abundance of electrons for electron transport chain in living cells. The study relating to application of a structurally altered gaseous water molecule to enhance production of ATP in living organisms has been performed. The only variable in the study was the introduction of the gas of the present disclosure. The method resulted in a 25% increase in ATP production and a trend towards a decrease in hydrogen peroxide reactive oxygen species (ROS) production during respiration supported by Complex II (0.00106 vs 0.00202 nmol $H_2O_2$/pmol $O_2$, p=0.089).

In the study, all other horses ran more than 15 min after drinking water infused with the structurally altered gaseous water molecules. The same horses ran more than 2 mins longer after drinking water infused with the structurally altered gaseous water molecules (908±182 sec (T); 1047±232 sec (H)). $VO_2$max was increased (94% probability) and their endurance was enhanced as reflected by the marked increase in the run time to fatigue in 7 of the 8 horses. These findings are compatible with and affirm the ex-vivo finding that mitochondrial ATP synthesis was enhanced in the presence of water infused with the structurally altered gaseous water molecules. The reason for the improvement in stamina also may be that the saturation of the body with re-structured water infused with the structurally altered gaseous water molecules may have been associated with a reduction in the presence and/or effect of oxidants like ROS in the muscles. Reduced production of ROS in the long head of the triceps following consumption of water infused with the structurally altered gaseous water molecules was mentioned in the report on the muscle biopsy component of this investigation, which is compatible with an increase in the efficiency of ATP production due to the finished structure of water infused with the structurally altered gaseous water molecules representing that of intracellular water.

Figure 21:
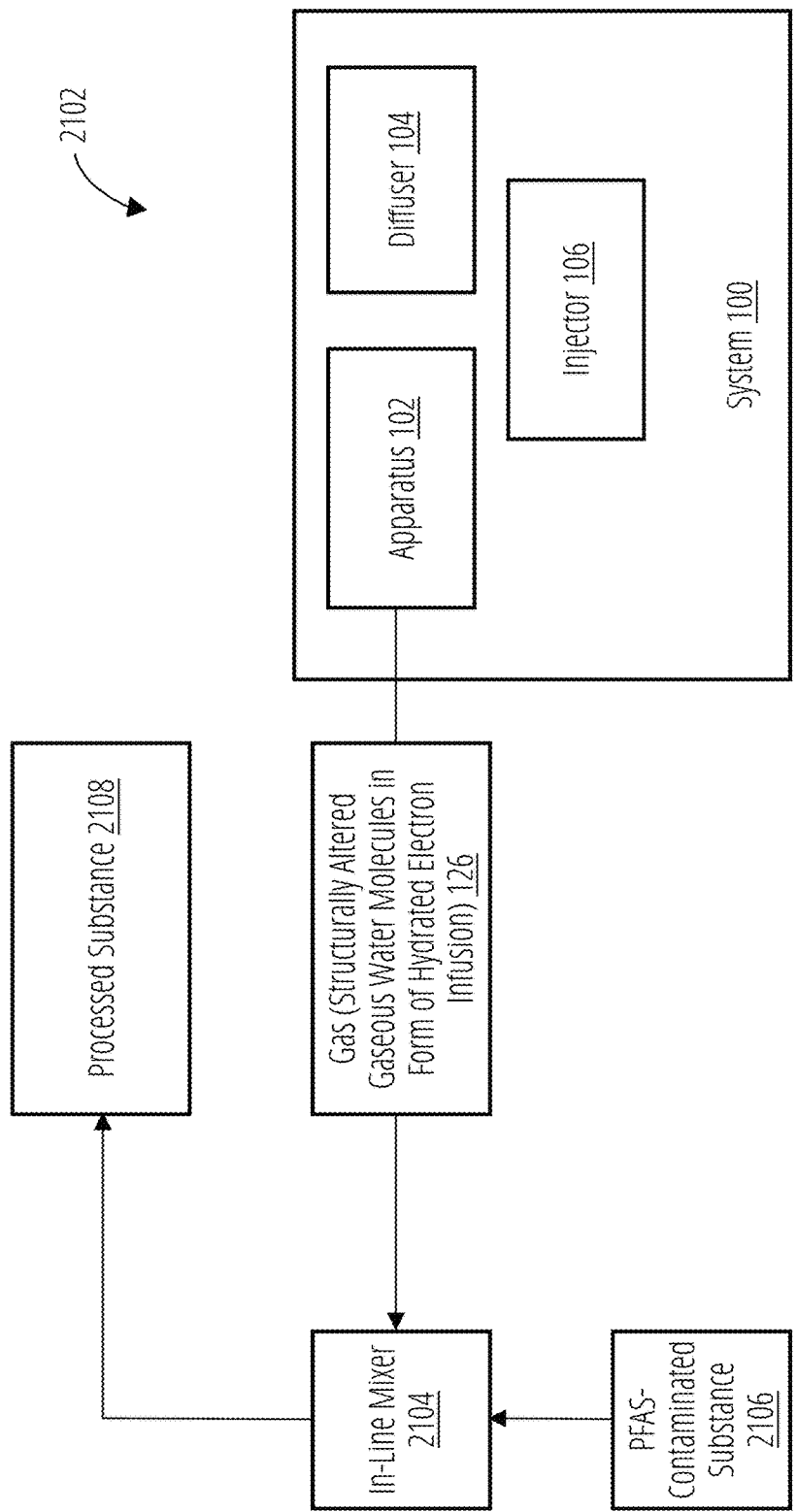
FIG. 21 is a block diagram illustrating a test system used in the study relating to deployment of structurally altered gaseous water molecules to provide degradation of PFAS, according to an example embodiment.

FIG. 21 is a block diagram 2102 illustrating a test system used in the study relating to deployment of structurally altered gaseous water molecules to provide degradation of PFAS. The purpose of the study was to determine the ability of the gas (i.e., the structurally altered gaseous water molecules) to deploy and diffuse excess electrons and hydrated electrons to degrade PFAS in a PFAS dosed sample of tap water. The key metrics used for this study are volume of gas per unit time, time of diffusion of the hydrated electrons in a test solution containing PFAS, and reductions in PFAS vs time.

In the study, the structurally altered gaseous water molecules (i.e., the hydrated electron infusion) generated by the apparatus 102 for generating structurally altered gaseous water molecules from water of the system 100 were provided to an in-line mixer 2104. Furthermore, a PFAS-contaminated substance 2106, which was a substance contaminated with PFAS above limits allowable by Environmental Protection Agency (EPA), was provided to the in-line mixer 2104. The in-line mixer 2104 mixed the structurally altered gaseous water molecules 126 with the PFAS-contaminated substance 2106. Upon mixing, a processed substance 2108 was provided. The amount of PFAS in the processed substance 2108 was below the limits allowed by EPA.

Materials used in the study included Cole Parmer 1000 μg/ml PFOS diluted to 526 parts per trillion, oil filled V&S Type-Q (0-15 psia) pressure gauge, Pyrex 2,000 ml graduated volumetric flasks, and a standard stainless steel gas diffuser. 2000 ml samples of processed substances were taken and sent for laboratory analysis using EPA Method 1633 Liquid Chromatography/Mass spectrometry LC/MS.

FIG. 22 shows a table 2202 illustrating data and results of the study. Specifically, table 2202 shows master test data using treatment by the method of the present disclosure. Two 70-minute-long test runs were made in this experiment. Samples were taken at 30-minute intervals. The first 70-minute-long run was made with the infusion of the structurally altered gaseous water molecules. The second test run was made with the infusion of ozone for 15 mins followed by the 70-minute runs using the structurally altered gaseous water molecules. The structurally altered gaseous water molecules were fed at a constant rate of 5.8 liters per minute to the 2000 ml samples. The pressure in the gas generator (shown as apparatus 102) was held at 3.25 psi pressure during all runs.

Figure 23:
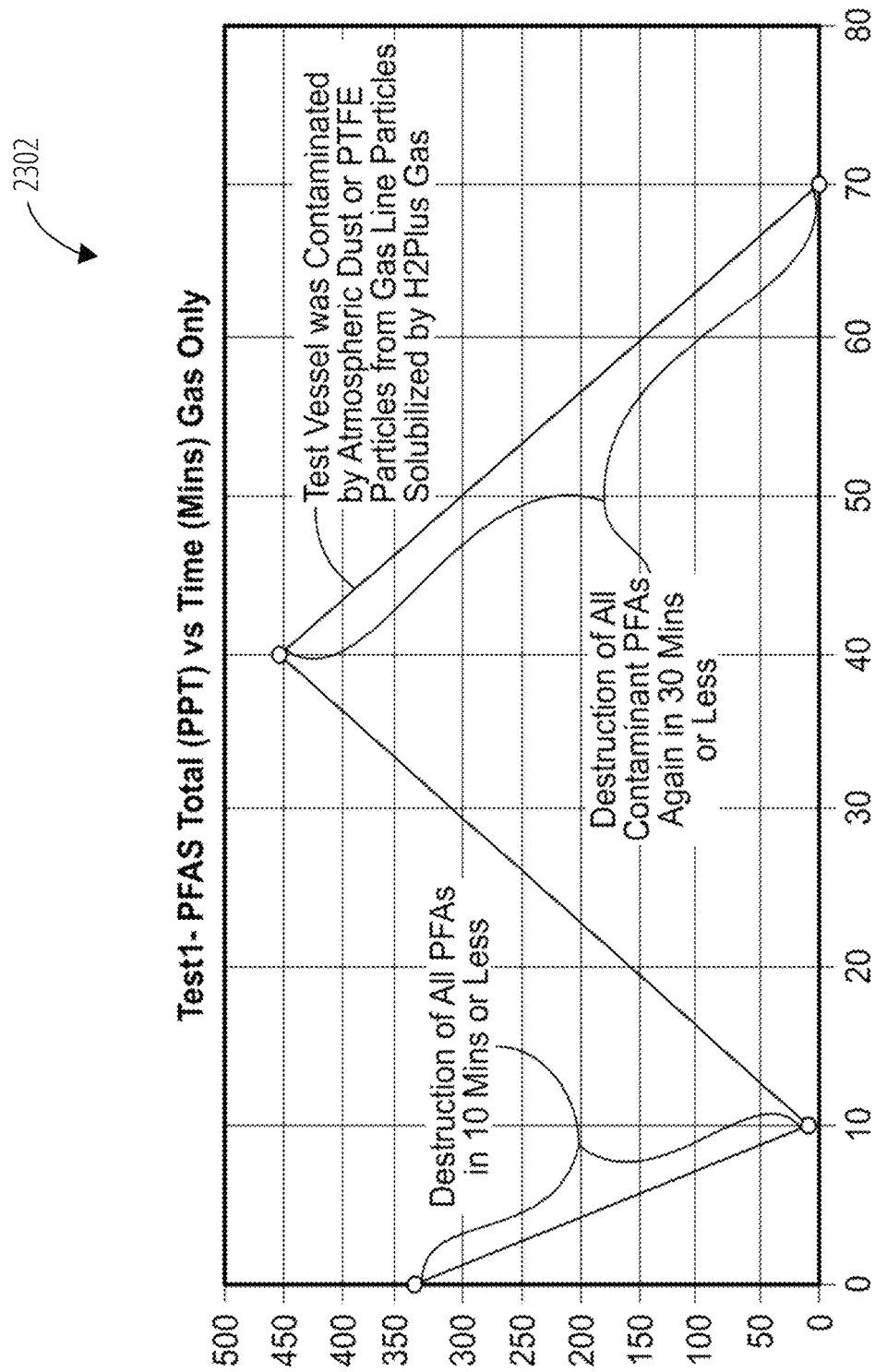
FIG. 23 is a diagram illustrating a test showing destruction of PFAS when structurally altered gaseous water molecules were supplied, according to an example embodiment.

FIG. 23 is a diagram 2302 illustrating Test 1 and showing PFAS total (ppt) vs time (mins) when the gas, i.e., structurally altered gaseous water molecules, was supplied. Destruction of all PFAS particles was achieved in minute 10. Specifically, the method of the present disclosure degraded all PFAS from 340.75 PPT to 9.8 PPT in 10 minutes or less.

Sometime between 10 and 40 minutes into Test 1, a test vessel was contaminated by atmospheric dust or polytetrafluoroethylene (a chemical in the PFAS family) particles from gas line particles solubilized by the gas. Specifically, an external airborne or test equipment contaminant entered the test vessel resulting in a PFAS spike to 453.67 PPT. Following this, at some time between 40 minutes and 70 minutes, all the PFAS degraded from 453.67 to below reporting limits for the EPA Method 1633 Liquid Chromatography/Mass spectrometry LC/MS (1633 test). In minute 70, destruction of all PFAS particles was achieved.

Figure 24:
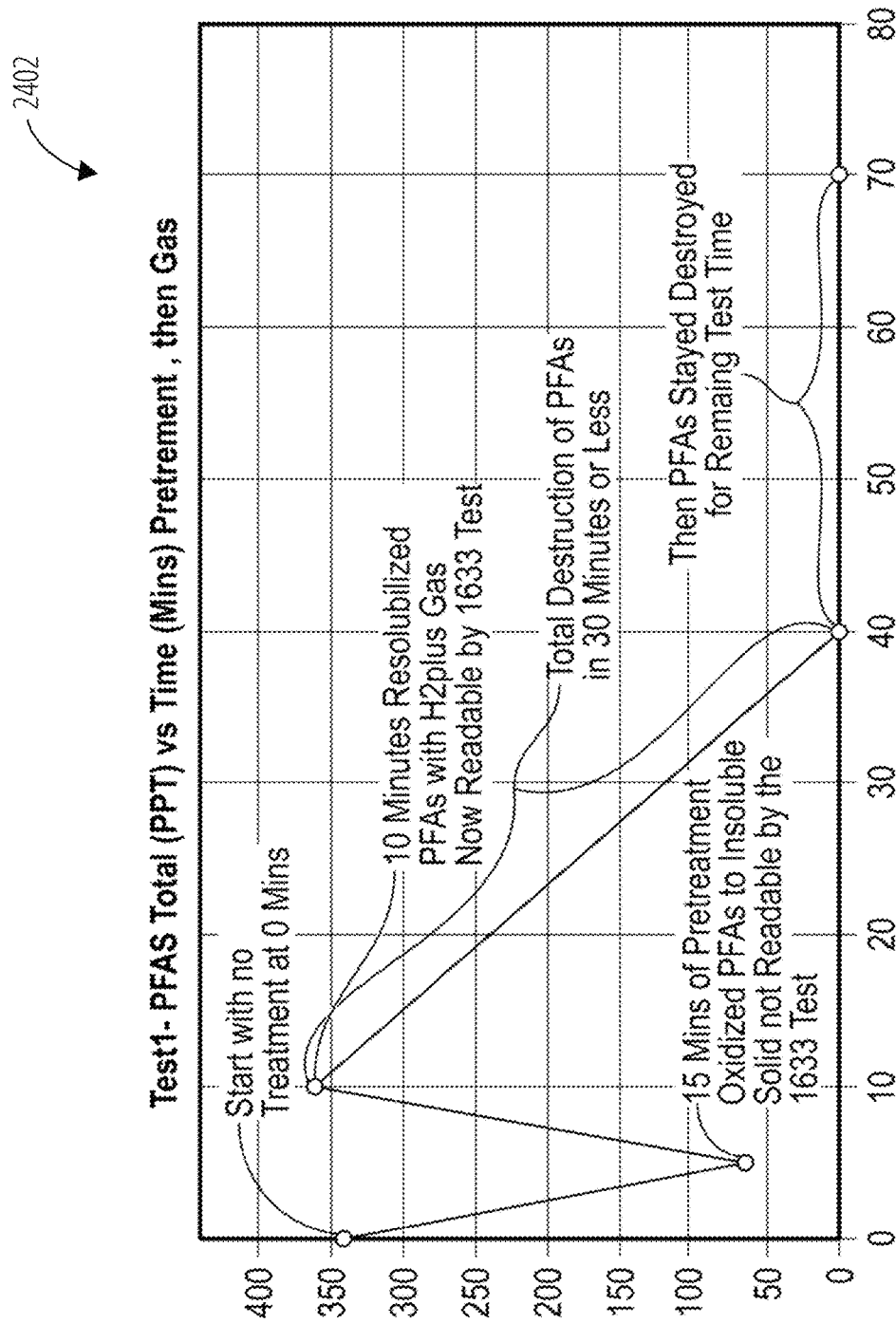
FIG. 24 is a diagram illustrating a test and showing destruction of PFAS when pretreatment was performed and when structurally altered gaseous water molecules were supplied, according to an example embodiment.

FIG. 24 is a diagram 2402 illustrating Test 2 and showing PFAS total (ppt) vs time (mins) when pretreatment was performed and then the gas, i.e., structurally altered gaseous water molecules, was supplied. The test started with no treatment. Then, 15 minutes of pretreatment oxidized PFAS to insoluble solid not readable by the 1633 test. After oxidizing the PFAS, the gas was supplied and resolubilized PFAS so that they became readable by the 1633 test. In 30 minutes or less after supplying the gas, total destruction of PFAS was achieved. Then, PFAS stayed destroyed for the remaining test time.

More specifically, the 15-minute oxidizer pretreatment in Test 2 oxidized and converted the PFAS in solution to mostly insoluble species that were difficult to measure with EPA method 1633. This is illustrated by the PFAS reduction from 340.75 PPT to 63.45 PPT at the 5-minute mark on the table 2202 and Test 2 diagram 2402. Then sometime between 0 and 10 minutes during the addition of the gas in this test, the total PFAS measurable amount increased to 359.22, with the majority of the total PFAS in the form of perfluorooctyl sulfonate. It is believed that the PFAS were ionized and became measurable again at this point. Then, sometime in the 30 minutes following, total PFAS were reduced to below reportable limits and remained there at the 70-minute mark when the test ended.

This experiment concludes that the addition of the structurally altered gaseous water molecules has demonstrated the ability to degrade PFAS in tap water in as little as 10 minutes or less.

Figure 25:
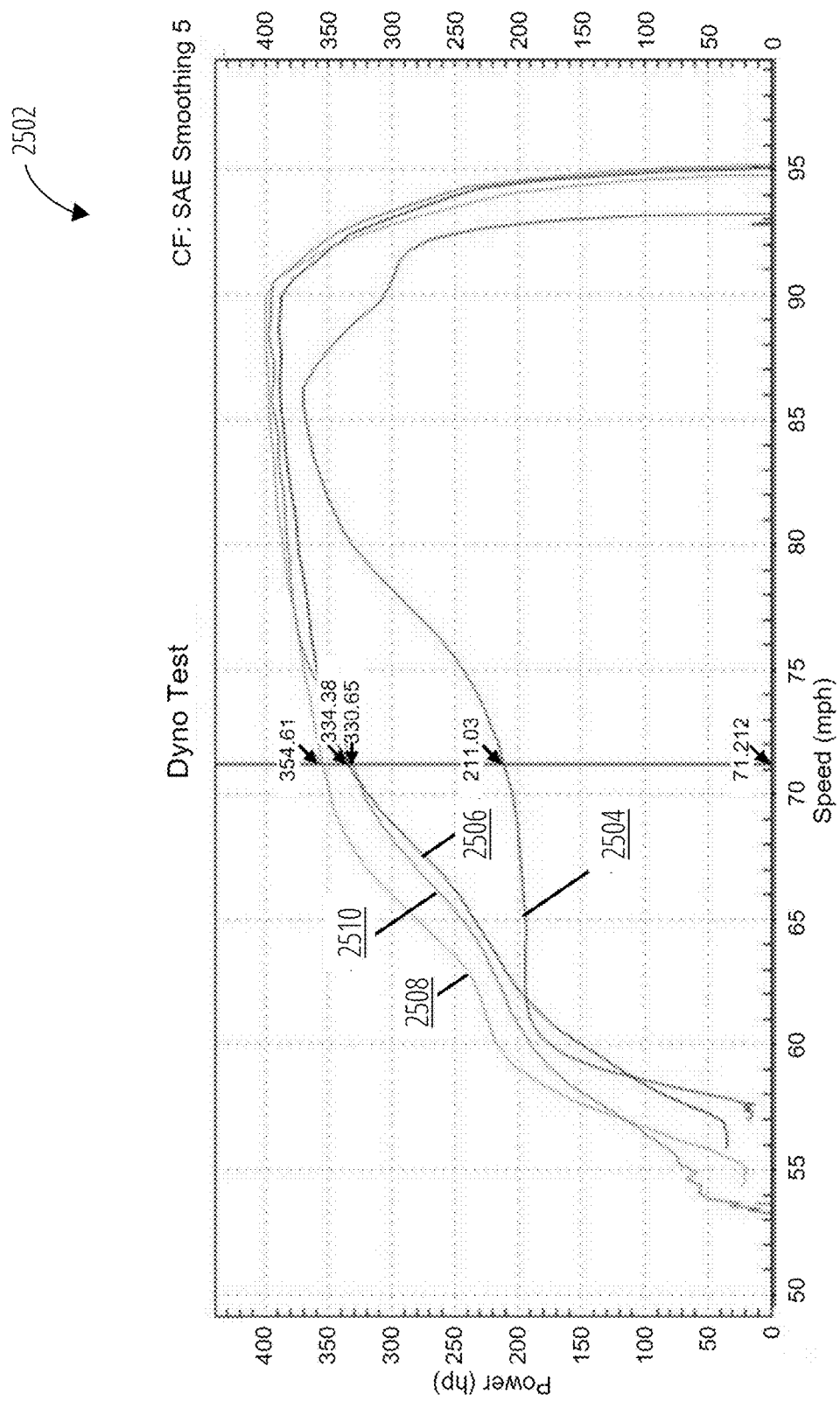
FIG. 25 is a diagram showing a dyno test analysis for a 110 octane fuel with and without infusion of structurally altered gaseous water molecules, according to an example embodiment.

FIG. 25 is a diagram 2502 showing a dyno test analysis for a 110 octane fuel with and without structurally altered gaseous water molecule infusion. The line 2504 represents the untreated fuel (i.e., a fuel not infused with the structurally altered gaseous water molecules) and the lines 2506, 2508, and 2510 are runs of the dyno test on the same 110 octane fuel infused with the structurally altered gaseous water molecules. All dyno tests for the 110 octane fuel infused with the structurally altered gaseous water molecules were performed at the same temperature, pressure, and conditions as those used for the dyno test of the untreated fuel. During the research, there was an average of 37.9% increase in horsepower (hp) at the 71.212 miles per hour mark on the dyno tests with the 110 octane fuel infused with the structurally altered gaseous water molecules.

The empirical evaluation of the emissions associated with the untreated fuel and the 110 octane fuel infused with the structurally altered gaseous water molecules (via a smell test) showed a significant decrease in unburned hydrocarbons and other undesirable emissions and smells shown by the 110 octane fuel infused with the structurally altered gaseous water molecules.

The method of the present disclosure provides the structurally altered gaseous water molecule that exhibits non-polar properties, and therefore less dipole moment behavior (i.e., less existence of a negatively charged end and a positively charged end). When the structurally altered gaseous water molecules are sufficiently mixed with other non-polar substances such as fossil fuels and biofuels, the structurally altered gaseous water molecules disperse the fossil and biofuel molecules to make them available for complete combustion in a shorter time frame in the intended combustion area. The result is higher efficiency, more power and less $CO_2e$ formed by completing the combustion from methane and carbon monoxide to a lower $CO_2e$ valued product, carbon dioxide, and at the same time the inhibition of the formation of $NO_x$ and $SO_x$. Dyno testing on a fossil fuel engine with the structurally altered gaseous water molecules added (see lines 2506, 2508, and 2510 in FIG. 25) and without the structurally altered gaseous water molecules (see line 2504 in FIG. 25) shows a horsepower increase of efficiency of approximately 30%.

The abundance of electrons provided by the structurally altered gaseous water molecules provide an environment where the lower activation energies of fossil fuels and biofuels, more specifically hydrogen (57 KJ/mole) and carbon (188 KJ/mole), can be achieved for complete combustion to carbon dioxide $CO_2$ and water $H_2O$. At the same time, there are sufficient available electrons provided by the structurally altered gaseous water molecules to inhibit the oxygen from taking the electrons from nitrogen and sulfur, inhibiting them from reaching their relatively higher activation energies to create $NO_2$ (400 KJ/mole) and $SO_2$ (297 KJ/mole). With the higher activation energies, nitrogen and sulfur are not oxidized, the oxygen is not reduced, and the $NO_x$ and $SO_x$ compounds are not readily formed during combustion or as present in the exhaust.

Figure 26:
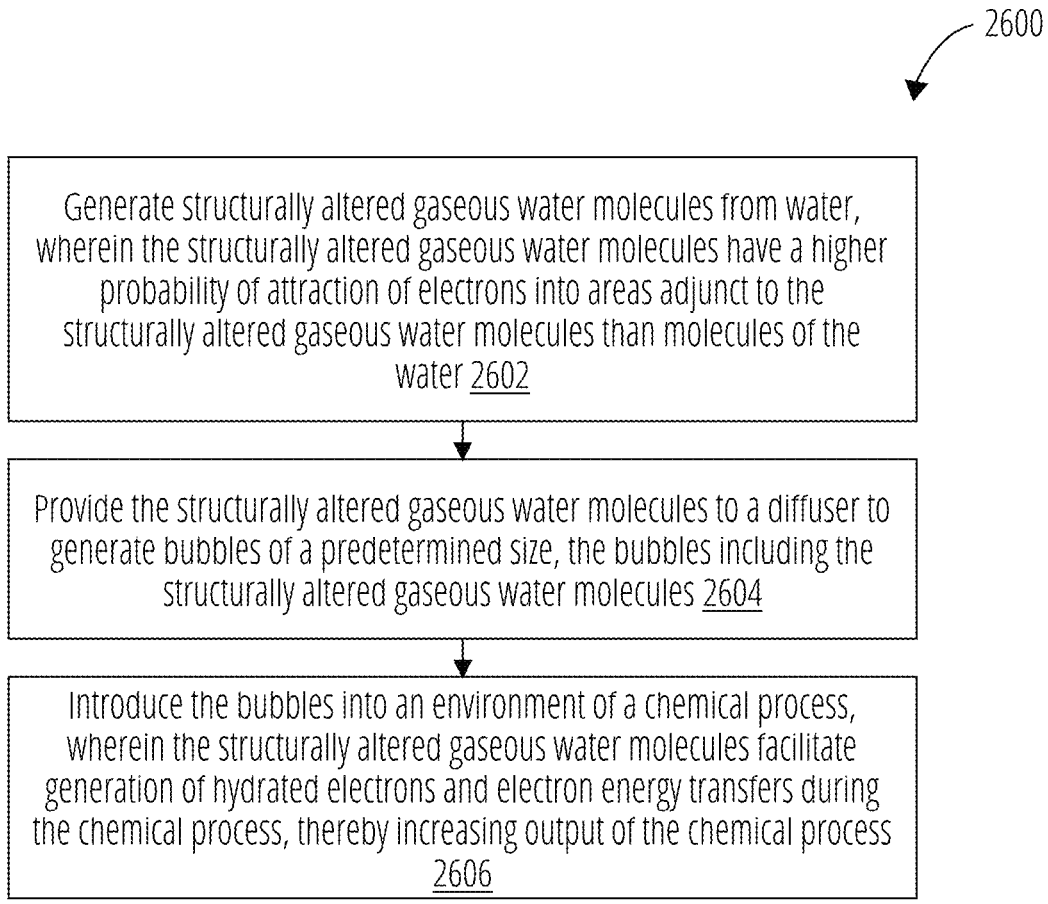
FIG. 26 is a flow chart of a method for deployment of structurally altered gaseous water molecules derived from water, according to an example embodiment.

FIG. 26 is a flow chart of a method 2600 for deployment of structurally altered gaseous water molecules derived from water, according to an example embodiment. In some embodiments, the operations of method 2600 may be combined, performed in parallel, or performed in a different order. The method 2600 may also include additional or fewer operations than those illustrated.

The method 2600 may commence in block 2602 with generating, by an apparatus for generating structurally altered gaseous water molecules, structurally altered gaseous water molecules from water. The structurally altered gaseous water molecules may have a higher probability of attraction of electrons into areas adjunct to the structurally altered gaseous water molecules than molecules of the water. In an example embodiment, the consumption of power to generate 1 kilogram of the structurally altered gaseous water molecules may be less than 9.8 kilowatt-hours.

In block 2604, method 2600 may proceed with providing the structurally altered gaseous water molecules to a diffuser to generate bubbles of a predetermined size. The bubbles may include the structurally altered gaseous water molecules.

In block 2606, method 2600 may include introducing, by an injector, the bubbles into an environment of a chemical process. The structurally altered gaseous water molecules may facilitate generation of hydrated electrons and electron energy transfers during the chemical process, thereby increasing output of the chemical process.

In an example embodiment, the chemical process may include degradation of polymeric and non-polymeric substances in contaminated water. In some example embodiments, the polymeric and non-polymeric substances may include PFAS.

In an example embodiment, a ratio of a volume of the bubbles and a volume of the polymeric substances and non-polymeric substances may be between 0.005 and 0.38. Temperature of the environment during the introduction of the bubbles may be between 33 degrees and 150 degrees in Fahrenheit.

In an example embodiment, the predetermined size of the bubbles may exceed 3,000,000 nanometers. Upon being infused in the contaminated water, the bubbles may cause a reduction of the concentration of the polymeric substances and non-polymeric substances by 98.4% in 60 minutes.

In an example embodiment, the predetermined size of the bubbles may be between 100,000 nanometers and 3,000,000 nanometers. Upon being infused in the contaminated water, the bubbles may cause a reduction of the concentration of the polymeric and non-polymeric substances by 58.7% in 90 minutes.

In an example embodiment, the predetermined size of the bubbles may be between 200 nanometers and 100,000 nanometers. Upon being infused in the contaminated water, the bubbles may cause a reduction of the concentration of the polymeric and non-polymeric substances by 76.6% in 60 minutes.

In some example embodiments, the predetermined size of the bubbles may be less than 200 nanometers. Upon being infused in the contaminated water, the bubbles may cause a reduction of the concentration of the polymeric and non-polymeric substances by 73.3% in 60 minutes.

Thus, systems and methods for deployment of structurally altered gaseous water molecules derived from water have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for deployment of structurally altered gaseous water molecules derived from water, the method comprising:
    generating, by applying a focused magnetic field and an electric field to a mixture of purified water and an electrolyte solution in a chemical reaction chamber, structurally altered gaseous water molecules from water, wherein the structurally altered gaseous water molecules:
        exist in a gas phase at standard temperature and pressure;
        have an O—H bond length between 0.95 and 1.3 angstroms;
        have an H—O—H bond angle between approximately 94 and 104 degrees; and
        have a higher probability of attraction of an electron energy into areas adjunct to the structurally altered gaseous water molecules than molecules of the water;
    providing the structurally altered gaseous water molecules to a diffuser to generate bubbles of a predetermined size, the bubbles including the structurally altered gaseous water molecules; and
    introducing the bubbles into an environment of a chemical process, wherein the structurally altered gaseous water molecules facilitate generation of hydrated electrons and electron energy transfers during the chemical process, thereby increasing output of the chemical process.

2. The method of claim 1, wherein the chemical process includes degradation of polymeric substances and non-polymeric substances in contaminated water.

3. The method of claim 2, wherein the polymeric substances and the non-polymeric substances include per- and polyfluoroalkyl substances (PFAS).

4. The method of claim 2, wherein a ratio of a volume of the bubbles and a volume of the polymeric substances and the non-polymeric substances is between 0.005 and 0.38.

5. The method of claim 2, wherein temperature of the environment during the introduction of the bubbles is between 33 degrees and 150 degrees Fahrenheit.

6. The method of claim 2, wherein:
    the predetermined size of the bubbles exceeds 3,000,000 nanometers; and
    upon being infused in the contaminated water, the bubbles cause a reduction of a concentration of the polymeric substances and the non-polymeric substances by 98.4% in 60 minutes.

7. The method of claim 2, wherein:
    the predetermined size of the bubbles is between 100,000 nanometers and 3,000,000 nanometers; and
    upon being infused in the contaminated water, the bubbles cause a reduction of a concentration of the polymeric substances and the non-polymeric substances by 58.7% in 90 minutes.

8. The method of claim 2, wherein:
    the predetermined size of the bubbles is between 200 nanometers and 100,000 nanometers; and
    upon being infused in the contaminated water, the bubbles cause a reduction of a concentration of the polymeric substances and the non-polymeric substances by 76.6% in 60 minutes.

9. The method of claim 2, wherein:
    the predetermined size of the bubbles is less than 200 nanometers; and
    upon being infused in the contaminated water, the bubbles cause a reduction of a concentration of the polymeric substances and the non-polymeric substances by 73.3% in 60 minutes.

10. The method of claim 1, wherein a consumption of power to generate 1 kilogram of the structurally altered gaseous water molecules is less than 9.8 kilowatt-hours.

11. A system for deployment of structurally altered gaseous water molecules derived from water, the system comprising:
    an apparatus for generating, by applying a focused magnetic field and an electric field to a mixture of purified water and an electrolyte solution in a chemical reaction chamber, structurally altered gaseous water molecules from water, wherein the structurally altered gaseous water molecules:
        exist in a gas phase at standard temperature and pressure;
        have an O—H bond length between 0.95 and 1.3 angstroms;
        have an H—O—H bond angle between approximately 94 and 104 degrees; and
        have a higher probability of attraction of electrons into areas adjunct to the structurally altered gaseous water molecules than molecules of the water;
    a diffuser for generating bubbles of a predetermined size from the structurally altered gaseous water molecules; and
    an injector for introducing the bubbles into an environment of a chemical process, wherein the structurally altered gaseous water molecules facilitate generation of hydrated electrons and electron energy transfers during the chemical process, thereby increasing output of the chemical process.

12. The system of claim 11, wherein the chemical process includes degradation of polymeric substances and non-polymeric substances in contaminated water.

13. The system of claim 12, wherein the polymeric substances and the non-polymeric substances include per- and polyfluoroalkyl substances (PFAS).

14. The system of claim 12, wherein a ratio of a volume of the bubbles and a volume of the polymeric substances and the non-polymeric substances is between 0.005 and 0.38.

15. The system of claim 12, wherein temperature of the environment during the introduction of the bubbles is between 33 degrees and 150 degrees Fahrenheit.

16. The system of claim 12, wherein:
   the predetermined size of the bubbles exceeds 3,000,000 nanometers; and
   upon being infused in the contaminated water, the bubbles cause a reduction of a concentration of the polymeric substances and the non-polymeric substances by 98.4% in 60 minutes.

17. The system of claim 12, wherein:
   the predetermined size of the bubbles is between 100,000 nanometers and 3,000,000 nanometers; and
   upon being infused in the contaminated water, the bubbles cause a reduction of a concentration of the polymeric substances and the non-polymeric substances by 58.7% in 90 minutes.

18. The system of claim 12, wherein:
   the predetermined size of the bubbles is between 200 nanometers and 100,000 nanometers; and
   upon being infused in the contaminated water, the bubbles cause a reduction of a concentration of the polymeric substances and the non-polymeric substances by 76.6% in 60 minutes.

19. The system of claim 12, wherein:
   the predetermined size of the bubbles is less than 200 nanometers; and
   upon being infused in the contaminated water, the bubbles cause a reduction of a concentration of the polymeric substances and the non-polymeric substances by 73.3% in 60 minutes.

20. The system of claim 11, wherein a consumption of power to generate 1 kilogram of the structurally altered gaseous water molecules is less than 9.8 kilowatt-hours.

\* \* \* \* \*